(12) United States Patent
Yamamoto et al.

(10) Patent No.: US 8,164,229 B2
(45) Date of Patent: Apr. 24, 2012

(54) ARMATURE FOR ROTATING ELECTRICAL MACHINE AND MANUFACTURING METHOD THEREOF

(75) Inventors: Yoshihisa Yamamoto, Anjo (JP); Kiyotaka Koga, Nishio (JP); Shinichi Otake, Nukata-gun (JP); Keiichi Shinohara, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 258 days.

(21) Appl. No.: 12/654,964

(22) Filed: Jan. 11, 2010

(65) Prior Publication Data

US 2010/0187938 A1    Jul. 29, 2010

(30) Foreign Application Priority Data

Jan. 28, 2009  (JP) ................. 2009-016854
Aug. 18, 2009  (JP) ................. 2009-189463

(51) Int. Cl.
*H02K 3/00*    (2006.01)
(52) U.S. Cl. .................... 310/179; 29/596
(58) Field of Classification Search ............ 310/179, 310/201, 207, 208
See application file for complete search history.

(56) References Cited

U.S. PATENT DOCUMENTS

| 6,960,857 | B2 * | 11/2005 | Oohashi et al. | 310/179 |
| 7,132,775 | B2 * | 11/2006 | Oohashi et al. | 310/201 |
| 7,569,966 | B2 * | 8/2009 | Saito et al. | 310/201 |
| 2004/0207283 | A1 | 10/2004 | Oohashi et al. | |
| 2008/0174199 | A1 | 7/2008 | Ishigami et al. | |

FOREIGN PATENT DOCUMENTS

| JP | A 2000-278903 | 10/2000 |
| JP | A 2003-88021 | 3/2003 |
| JP | B2 3798968 | 7/2006 |
| JP | A 2007-325472 | 12/2007 |
| JP | A 2008-125328 | 5/2008 |
| JP | A 2008-167567 | 7/2008 |
| WO | WO 92/01327 | 1/1992 |

OTHER PUBLICATIONS

International Search Report mailed Mar. 2, 2010 for PCT/JP2009/070762.

* cited by examiner

*Primary Examiner* — Nguyen N Hanh
(74) *Attorney, Agent, or Firm* — Oliff & Berridge, PLC

(57) ABSTRACT

An armature for a rotating electrical machine, the armature includes a cylindrical core having a plurality of longitudinally extending slots that are dispersedly arranged in a circumferential direction; and coils wound around the slots, wherein each of the slots is formed such that an inner circumferential opening thereof that is open radially inwardly is smaller in a circumferential width than a slot interior positioned on a radially outer side of the inner circumferential opening, and linear conductors forming the coils are each formed to be larger in the circumferential width than the inner circumferential opening.

15 Claims, 12 Drawing Sheets

FIG. 9A
FIG. 9B
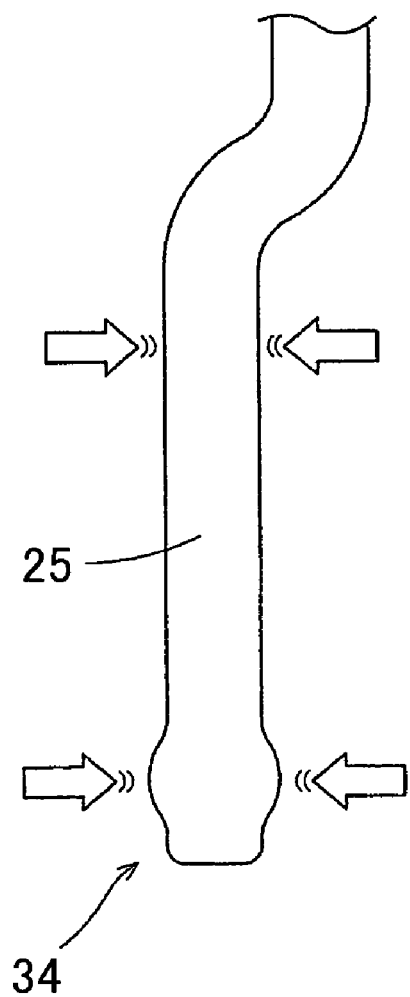
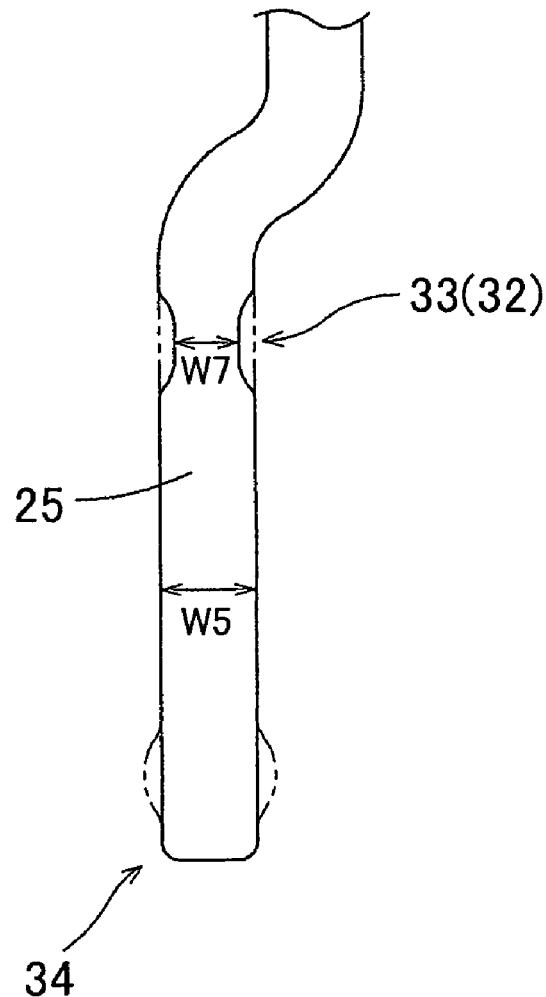

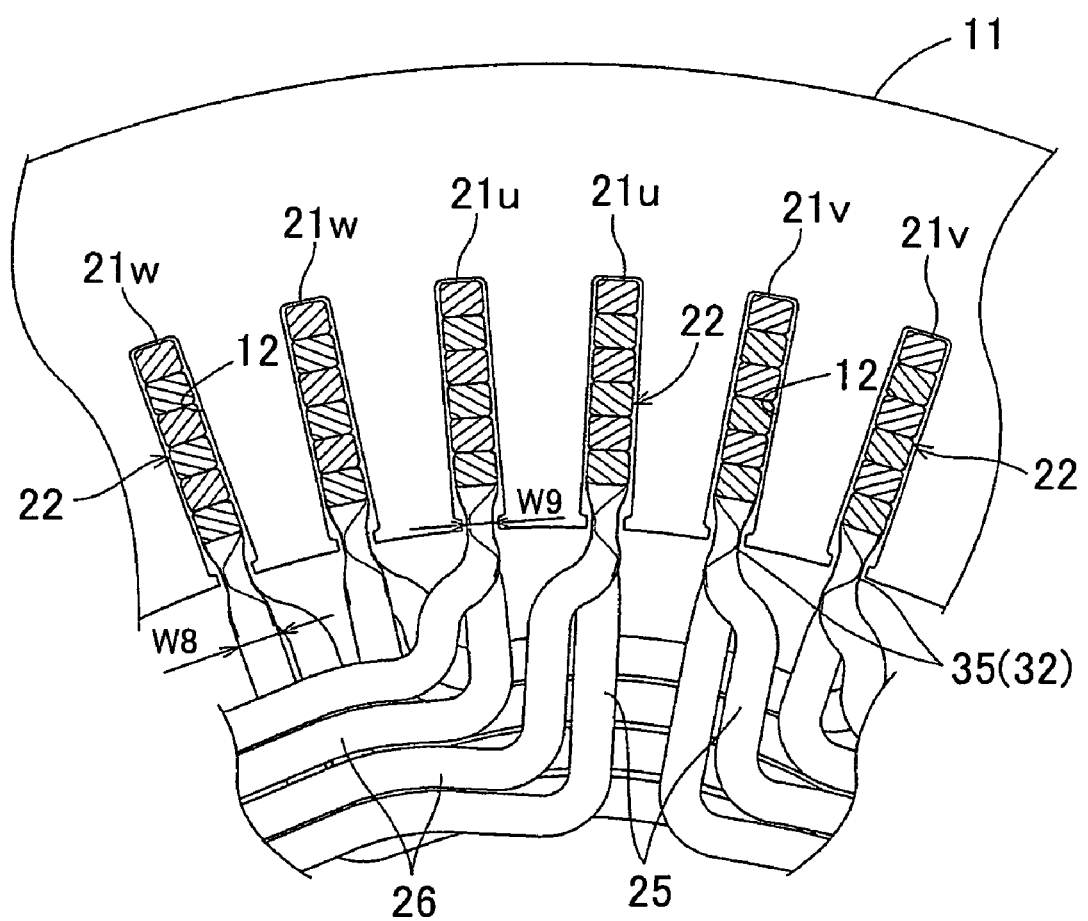

ARMATURE FOR ROTATING ELECTRICAL MACHINE AND MANUFACTURING METHOD THEREOF

INCORPORATION BY REFERENCE

The disclosure of Japanese Patent Application No. 2009-016854 filed on Jan. 28, 2009 and Japanese Patent Application No. 2009-189463 filed on Aug. 18, 2009, including the specification, drawings and abstract is incorporated herein by reference in its entirety.

BACKGROUND

The present invention relates to an armature for a rotating electrical machine including a cylindrical core having a plurality of longitudinally extending slots that are dispersedly arranged in a circumferential direction, and coils wound around the slots, and to a manufacturing method thereof.

Generally, a rotating electrical machine used as a motor (electric motor) or a generator (electrical generator) or the like is required to be capable of providing greater output while being smaller in size. Accordingly, one of the important problems to be solved is to increase the energy efficiency of the rotating electrical machine. As the techniques for increasing the energy efficiency of the rotating electrical machine, for example, the technique for improving the space factor of the coils in the armature of the rotating electrical machine has conventionally been known.

One reference that describes an improvement in the space factor of the coils may be Japanese Patent Application Publication JP-A-2008-167567 listed below. Japanese Patent Application Publication JP-A-2008-167567 describes a stator as an armature for a rotating electrical machine, in which the coils are each formed using a rectangular wire conductor having a substantially rectangular cross-sectional shape, whereby the space factor is improved and the ampere-turn per unit cross-sectional area is increased. Thus, the output of the rotating electrical machine is improved.

In the rotating electrical machine described in Japanese Patent Application Publication JP-A-2008-167567, each of the slots of the stator is an open slot (a slot in which an opening that is open radially inward is equal to or greater in the circumferential width than the portion for accommodating the coils), and the coils preformed into a prescribed shape through continuous winding are radially inserted from the openings of the slots while being deformed circumferentially and longitudinally, and thereby being wound around the slots. Thus, the number of portions to be electrically connected after the insertion of the coils into the slots can be reduced, whereby the productivity can be improved.

Another reference that describes an improvement in the space factor of the coils may be Japanese Patent No. 3798968 listed below. Japanese Patent No. 3798968 describes a stator as an armature for a rotating electrical machine, in which fine wires are stacked circumferentially and radially to form each coil of a prescribed shape. Here, in order to improve the space factor in each slot, the fine wires are stacked and bundled so as to have a cross-sectional shape that conforms to that of the slot.

In the stator of the rotating electrical machine described in Japanese Patent No. 3798968, each of the slots of the core of the stator is a semi-open slot (a slot in which an opening that is open radially inward is smaller in the circumferential width than the portion for accommodating the coils). Thus, also by increasing the effective magnetic flux effecting between the stator and the rotor as a field, the output of the rotating electrical machine is improved. Here, in accordance with the use of the semi-open slot type core in the stator of the rotating electrical machine, the fine wires are preformed so as to be curved radially inward and to be longitudinally stacked at coil end portions located on one longitudinal side of the coils. In other words, at the site where the fine wires forming each coil extend radially, the fine wires are not circumferentially stacked. Thus, the circumferential width of that portion is made smaller than the width of the opening on the radially inner side of each slot. Then, the preformed coils are longitudinally inserted from the curved coil end portion side to be wound around the slots of the core.

SUMMARY

However, since the rotating electrical machine described in Japanese Patent Application Publication JP-A-2008-167567 employs the open-slots, the circumferential width of the opening of each slot is large, and the surface area on the rotor side of each rectangular wire conductor is large. Accordingly, when the rotor rotates, the magnetic flux from a permanent magnet or the like reaches the rectangular wire conductor, whereby an eddy current is generated on its surface on the rotor side. This causes an increase in the eddy-current loss, and in some cases the energy efficiency of the rotating electrical machine is impaired.

In this connection, one possibility for reducing the eddy-current loss by reducing the amount of the magnetic flux from the permanent magnet or the like reaching the rectangular wire conductors may be to employ the semi-open slot type core as described in Japanese Patent No. 3798968. However, when the rotating electrical machine is structured using the semi-open slot type core and the coils formed with rectangular wire conductors, the circumferential width of each rectangular wire conductor itself is larger than the circumferential width of the opening of each slot. Therefore, the coils cannot be inserted into the slots from the radially inner side in the manner described in Japanese Patent Application Publication JP-A-2008-167567. Additionally, with the structure where the coil end portion on one longitudinal side is curved radially inward, again the circumferential width of the rectangular wire conductor itself is larger than the circumferential width of the opening of each slot. Hence, the coil cannot be longitudinally inserted into the slots in the manner as described in Japanese Patent No. 3798968.

As such, because of the difficulty involved in the manufacturing itself, the rotating electrical machine has not been structured using the semi-open slot type core and the coil formed with rectangular wire conductors. In other words, the technique for achieving both an improvement in the space factor of the coil and a reduction in the eddy-current loss has not been established.

In order to solve the problems described above, it is an object of the present invention to provide an armature for a rotating electrical machine that can improve the space factor of the coils and reduce the eddy-current loss.

In order to achieve the object of the present invention, a characteristic structure of an armature for a rotating electrical machine according to the present invention including a cylindrical core having a plurality of longitudinally extending slots that are dispersedly arranged in a circumferential direction, and coils wound around the slots resides in that: each of the slots is formed such that its inner circumferential opening that is open radially inwardly is smaller in a circumferential width than a slot interior positioned on a radially outer side of the inner circumferential opening, and linear conductors forming the coils are each formed to be larger in the circumferential width than the inner circumferential opening; the coils include coil end portions connecting between coil side portions arranged in different ones of the slots at opposite longitudinal ends of the core, and the coil end portions located on one longitudinal side of the slots are curved coil end portions formed as curved radially inwardly; the curved coil end portions each include radial conductor portions radially extending from the coil side portions, and a circumferential conductor portion connecting between a pair of the radial conductor portions on the radially inner side than the inner circumferential openings; and the radial conductor portions are each provided with a narrow-width concave portion that is recessed relative to the other portions of the radial conductor portion, at a radial position in the radial conductor portion corresponding to one of the inner circumferential openings, so as to be smaller in the circumferential width of the inner circumferential opening.

In the present application, the terms referring to directions "longitudinally", "radially" and "circumferentially" are defined with reference to the cylindrical core, and "the longitudinal direction" refers to the direction along the center axis of the core, "the radial direction" refers to the direction perpendicular to the direction along the center axis of the core (longitudinal direction), and "the circumferential direction" refers to the encircling direction around the center axis of the core (or the direction tangent thereto). Here, the directions about the coils are defined on the condition that the coils are in a state being wound around the slots.

Further, the term "linear conductor" is used as a concept expressing a conductor as a single linear member forming the turns of the coil.

Still further, the term "rotating electrical machine" is used as a concept including any of a motor (electric motor), a generator (electrical generator), and a motor-generator that functions both as a motor and a generator as necessary.

With this characteristic structure, even when the linear conductors forming the coils are each formed to be larger in the circumferential width than the inner circumferential opening of each of the slots, the coils can longitudinally be inserted from the curved coil end portion side into the slots of the core, by allowing the narrow-width concave portions to pass through the inner circumferential openings of the slots.

Here, since the circumferential width of each linear conductor can arbitrarily be set in a range permitting the coils to be wound around the slots, the space factor of the coils can be improved by setting the circumferential width of each linear conductor to be, for example, substantially equal to that of each slot interior.

In this structure, each of the slots of the core is a so-called semi-open slot, in which the inner circumferential opening is smaller in the circumferential width than the slot interior. Therefore, the volume of the magnetic flux from a permanent magnet or the like of the field reaching the surface of the linear conductors forming the coils can be reduced. Hence, generation of an eddy current can be suppressed, whereby the eddy-current loss can be reduced.

Accordingly, with this characteristic structure, an armature for a rotating electrical machine that can improve the space factor of the coils and reduce the eddy-current loss can be provided.

Here, suitably, the narrow-width concave portions are each a compressive shaped portion formed with the radial conductor portion that is circumferentially compressed and longitudinally extended.

With this structure, just by compressing the radial conductor portion in each of the curved coil end portions, at a radial position corresponding to the inner circumferential opening of each of the slots, the compressive shaped portions serving as the narrow-width concave portions can easily be formed. It is to be noted that, when curving radially inwardly the coil end portions on one longitudinal side to be the curved coil end portions, in some cases the linear conductors forming the coils may be increased in the circumferential width at respective curved portions, as compared with the state before the liner conductors are curved. Accordingly, in order to ensure longitudinal insertion of the coils into the slots while keeping the excellent space factor, it is suitable to circumferentially compress the portions that circumferentially bulge at the curved portions, before inserting the coils into the slots. With this structure, since the narrow-width concave portions (compressive shaped portions) can be formed at the same time when circumferentially compressing the circumferentially bulging portions at the curved portions, the narrow-width concave portions (compressive shaped portions) can easily be formed.

Additionally, with this structure, the area of the cross section of any coil taken perpendicularly to the current passing direction can be maintained to be substantially constant over the entire coils. In this case, the electric resistance in the compressive shaped portions can be substantially equal to that in the portion except for the compressive shaped portions. Accordingly, it is possible to prevent disadvantageous events such as an increase in the amount of heat generation locally in the compressive shaped portions.

In this characteristic structure, suitably, in a cross section of each of the linear conductors taken perpendicularly to an extending direction of the linear conductor, a direction along the circumferential direction inside each of the slots is a first direction and a direction perpendicular to the first direction is a second direction. The linear conductors are each formed such that a second direction width is smaller than the circumferential width of each of the inner circumferential openings. Each of the narrow-width concave portions is suitably a twist shaped portion formed with the radial conductor portion having its site corresponding to one of the inner circumferential openings twisted relative to the other portions of the radial conductor portion, such that the second direction becomes substantially parallel to the circumferential direction.

In the present application, "the second direction width" expresses the width of each linear conductor, as seen from the direction perpendicular to the second direction in a cross section taken perpendicularly to the extending direction of the linear conductor.

With this structure, by twisting a site corresponding to the inner circumferential opening in the radial conductor portion relative to the other portion of the radial conductor portion, and thereby forming a twist shaped portion, the narrow-width concave portion can be formed. Here, it is not necessary to greatly deform the radial conductor portions locally, nor to apply great force to the radial conductor portions locally. Therefore, insulation films covering the linear conductors can be prevented from being damaged by formation of the narrow-width concave portions.

Additionally, in order to take full advantage of being a semi-open slot type core, the circumferential width of each inner circumferential opening is desirably minimized under the condition that the inner circumferential openings and the linear conductors do not interfere with each other. With this structure, such interference can be avoided simply by employing the linear conductor whose second direction width is smaller than the circumferential width of each inner circumferential opening.

Additionally, also with this structure, the area of the cross section of any coil taken perpendicularly to the current passing direction can be maintained to be substantially constant over the entire coils. Therefore, it is possible to prevent disadvantageous events such as an increase in the amount of heat generation locally in the compressive shaped portions.

In the structure in which the narrow-width concave portions are each the compressive shaped portion formed with the radial conductor portion that is circumferentially compressed and longitudinally extended, or in which the narrow-width concave portion is the twist shaped portion formed with the radial conductor portion having its site corresponding to one of the inner circumferential openings twisted relative to the other portions of the radial conductor portion, it is suitable that in the coils, a plurality of the linear conductors forming the coil side portions are arranged radially juxtaposed to one another in each of the slots, and the linear conductors forming the curved coil end portions are arranged longitudinally juxtaposed to one another, and the narrow-width concave portions are arranged longitudinally juxtaposed to one another.

When the narrow-width concave portions are longitudinally extended as the compressive shaped portions, by arranging them longitudinally juxtaposed to one another, the compressive shaped portions have respective longitudinally extended portions abutting on one another in the longitudinal direction, thereby repelling one another. When the narrow-width concave portions are formed as the twist shaped portions, the longitudinal height of the linear conductor in each twist shaped portion becomes higher than that of the other portions of the radial conductor portion adjacent to the twist shaped portion. Therefore, by arranging the narrow-width concave portions (twist shaped portions) longitudinally juxtaposed to one another, their respective longitudinally high portions abut on one another in the longitudinal direction, thereby repelling one another. As a result, the longitudinal distance between each of the linear conductors arranged longitudinally juxtaposed to one another becomes wide, at those sites in the curved coil end portions except for the narrow-width concave portions. Thus, when a coolant is introduced to flow between each of the linear conductors, the flow of the coolant is facilitated and accordingly the cooling efficiency is improved.

Further, suitably, the coils are of a plurality of phases that are different from one another, and in the coils of respective phases, the linear conductors of respective different phases forming the circumferential conductor portions are arranged longitudinally juxtaposed to one another.

With this structure, even when the linear conductors arranged longitudinally juxtaposed to one another respectively form the coils of different phases, a certain distance may easily be kept between respective different phase coils. Therefore, the structure for insulation can be simplified. Accordingly, depending on the conditions such as the maximum value of the current passing through the coils or the maximum value of the voltage applied across the coils, it becomes possible to ensure the electric insulation among the coils of respective phases without providing particular structure. Accordingly, the present invention can effectively be applied to the armature for a rotating electrical machine having this structure.

Further, suitably, a phase-to-phase insulation sheet is arranged between respective linear conductors of different phases, on a radially inner side of the compressive shaped portions in the curved coil end portions.

With this structure, the electric insulation among the coils of respective phases can be ensured more appropriately by the phase-to-phase insulation sheet. Here, the longitudinal distance between each of the linear conductors arranged longitudinally juxtaposed to one another as mentioned above becomes wide, and therefore a certain distance is ensured. Hence, the insulation performance required for the phase-to-phase insulation sheets can be lowered, and therefore the manufacturing costs can be reduced. Additionally, the stress applied on the phase-to-phase insulation sheets between respective linear conductors can be reduced, and therefore a steady insulation quality can be achieved. Accordingly, the present invention can effectively be applied to the armature for a rotating electrical machine having this structure.

Still further, the structure is suitably such that: the core includes projections at a tip of a radially inwardly projecting tooth positioned between the slots adjacent to each other, the projections oppositely projecting in the circumferential direction to form opposite circumferential walls of the inner circumferential openings; a slot-internal insulation sheet is arranged between each slot and the coil side portions therein, so as to wrap around the coil side portions and to cover the inner circumferential opening; and the opposite ends in the wrapping direction of the slot-internal insulation sheet are latched onto the projections.

With this structure, with the slot-internal insulation sheets, the electric insulation between the core and the coil side portions can properly be ensured. Since each slot-internal insulation sheet is arranged such that its opposite ends in the direction wrapping around the coil side portions are latched onto the projections provided at the core and to cover the inner circumferential opening of each slot, the coil side portions can effectively be prevented from slipping off inwardly in the radial direction, without adding any particular structure. Additionally, the electric insulation between the coil side portions and the field can be ensured.

A characteristic structure of a manufacturing method of an armature for a rotating electrical machine according to the present invention which is provided with a cylindrical core having a plurality of longitudinally extending semi-open type slots that are dispersedly arranged in a circumferential direction, and coils wound around the slots, wherein linear conductors forming the coils are each formed to be larger in a circumferential width than an inner circumferential opening of each of the slots that is open radially inwardly, and the coils include curved coil end portions each connecting between coil side portions arranged in different ones of the slots at one longitudinal end of the core, and each formed as curved radially inwardly, resides in that the method includes: forming of, at a radial position corresponding to one of the inner circumferential openings in a radial conductor portion extending radially from each of the coil side portions in the curved coil end portions, a narrow-width concave portion that is recessed relative to the other portions of the radial conductor portion, such that the narrow-width concave portion becomes smaller in the circumferential width than the inner circumferential opening; and inserting longitudinally the coils from a curved coil end portion side into the slots in a state where the narrow-width concave portion formed in the forming of the narrow-width concave portion is aligned at the position of the inner circumferential opening.

With this structure, in the coils having the curved coil end portions on one longitudinal side, through the forming of the narrow-width concave portion, the radial conductor portions are provided with, at the radial positions corresponding to the inner circumferential openings of the slots (semi-open slots), the narrow-width concave portions that are each recessed relative to the other portions of the radial conductor portions, and are each smaller in the circumferential width than the inner circumferential opening. Accordingly, even when the linear conductors forming the coils are each larger in the circumferential width than the inner circumferential opening of each of the slots, the coils can longitudinally be inserted from the curved coil end portion side into the slots of the core, by allowing the narrow-width concave portions formed through the previous forming of the narrow-width concave portion to pass through the inner circumferential openings of the slots in the inserting.

Here, since the circumferential width of each linear conductor can arbitrarily be set in a range permitting the coils to be wound around the slots, the space factor of the coils can be improved by setting the circumferential width of each linear conductor to be, for example, substantially equal to that of each slot interior.

Further, in this structure, each of the slots of the core is a semi-open slot in which the inner circumferential opening is narrower in the circumferential width than the slot interior. Therefore, the volume of the magnetic flux from a permanent magnet or the like of the field reaching the surface of the linear conductors forming the coils can be reduced. Hence, generation of an eddy current can be suppressed, whereby the eddy-current loss can be reduced.

Accordingly, with this structure, an armature for a rotating electrical machine that can improve the space factor of the coils and reduce the eddy-current loss can be manufactured.

Here, suitably, the forming of the narrow-width concave portion is compressing circumferentially a site in the radial conductor portion corresponding to the inner circumferential opening.

With this structure, the forming of the narrow-width concave portion can be a simple step of circumferentially compressing a site in the radial conductor portion corresponding to the inner circumferential opening (the compressing).

In this characteristic structure, it is suitably structured such that: in a cross section of each of the linear conductors taken perpendicularly to an extending direction of the linear conductor, a direction along the circumferential direction inside each of the slots is a first direction and a direction perpendicular to the first direction is a second direction; the linear conductors are each formed such that the second direction width is smaller than the circumferential width of each of the inner circumferential openings; and the forming of the narrow-width concave portion is twisting a site corresponding to the inner circumferential opening in the radial conductor portion relative to the other portions of the radial conductor portion, such that the second direction becomes substantially parallel to the circumferential direction.

With this structure, the forming of the narrow-width concave portion can be a simple step of twisting a site corresponding to the inner circumferential opening in the radial conductor portion relative to the other portion of the radial conductor portion (the twisting). Here, it is not necessary to greatly deform the radial conductor portions locally, nor to apply great force to the radial conductor portions locally. Therefore, the insulation films covering the linear conductors can be prevented from being damaged by formation of the narrow-width concave portions.

Further, in the structure where the forming of the narrow-width concave portion is the compressing, it is suitable that, in the compressing, simultaneously with the formation of the narrow-width concave portion, a curved portion of the radial conductor portion constituting the coils is further compressed circumferentially.

When curving radially inwardly the coil end portions on one longitudinal side to be the curved coil end portions, in some cases the linear conductors forming the coils may be increased in the circumferential width at respective curved portions, as compared with the state before the liner conductors are curved. Accordingly, in order to ensure longitudinal insertion of the coils into the slots while keeping the excellent space factor, it is suitable to circumferentially compress the portions that circumferentially bulge at the curved portions, before the inserting. With this structure, each radial conductor portion and each curved portion formed near to each other in the same linear conductor can both be compressed in the circumferential direction in a single step. Therefore, the armature for a rotating electrical machine according to the present invention can be manufactured without complicating the manufacturing steps.

Further, suitably, the core includes projections at a tip of a radially inwardly projecting tooth positioned between the slots adjacent to each other, the projections oppositely projecting in the circumferential direction to form opposite circumferential walls of the inner circumferential openings, and in the inserting, the coils are inserted into the slots in a state where a slot-internal insulation sheet arranged in each of the slots is open while extending radially inwardly with respect to the inner circumferential opening. Suitably, the method further includes latching ends of the slot-internal insulation sheet extending radially inwardly onto the projections, after the inserting.

With this structure, the coils can be inserted into the slots in the inserting, in a state where the slot-internal insulation sheets are interposed between the core and the coils and, therefore, the coils can be inserted into the slots without damaging insulating films covering the linear conductors forming the coils.

Further, in the latching following the inserting, by allowing the ends of each slot-internal insulation sheet to be latched onto the projections, it becomes possible to cover the inner circumferential opening of the slot and to effectively prevent the coil side portions forming the coils from slipping off inwardly in the radial direction without adding any particular structure.

Still further, with the slot-internal insulation sheets, the electric insulation between the core and the coil side portions, and between the coil side portions and the field can properly be ensured.

BRIEF DESCRIPTION OF THE DRAWINGS

FIGS. 9A and 9B are explanatory drawings for showing a compressing step for manufacturing the stator according to the first embodiment of the present invention;

FIG. 13 is a plan view partially showing a stator according to a second embodiment of the present invention;

DETAILED DESCRIPTION OF EMBODIMENTS

First Embodiment

Figure 1:
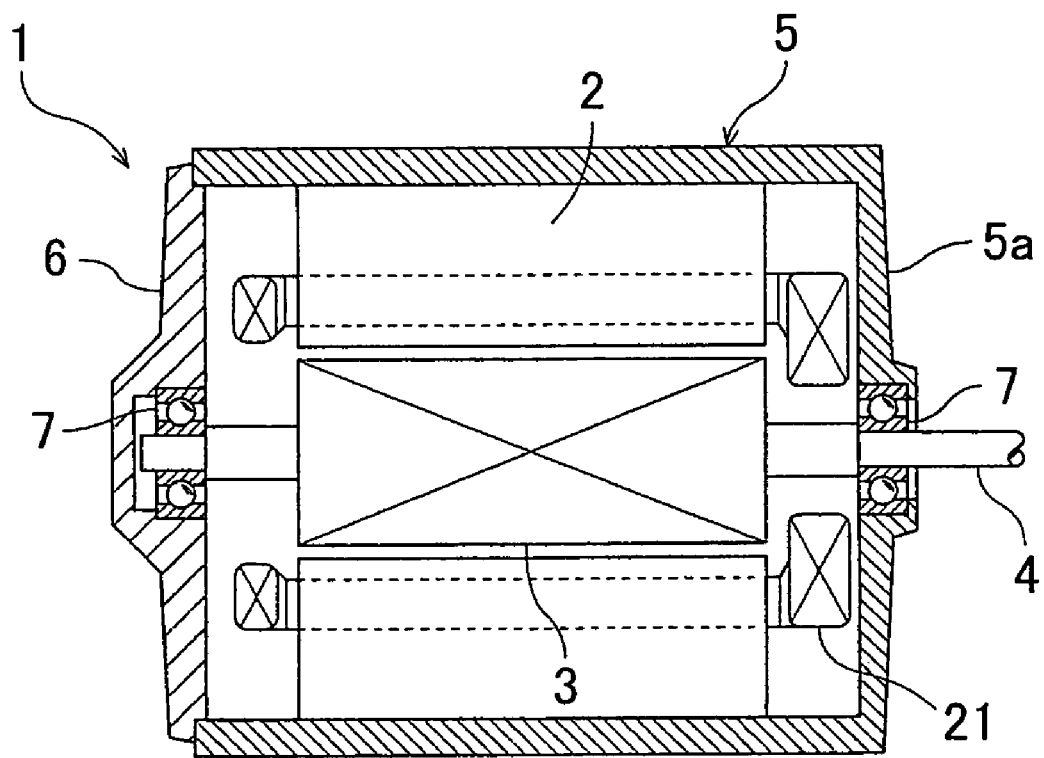
FIG. 1 is a cross-sectional view showing the overall structure of a rotating electrical machine according to a first embodiment of the present invention.
Figure 2:
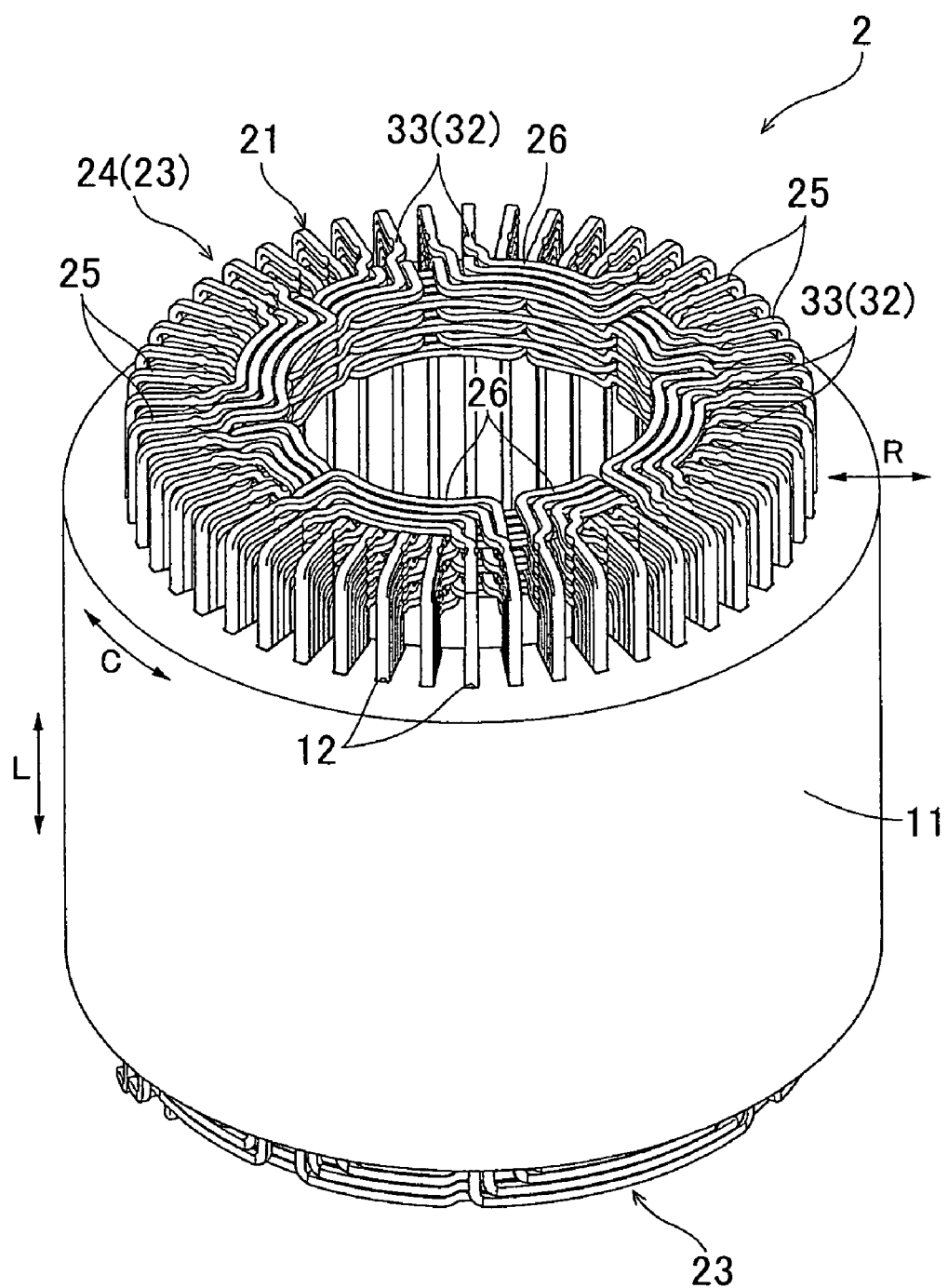
FIG. 2 is a perspective view showing the overall structure of a stator according to the first embodiment of the present invention.

Referring to the drawings, a first embodiment of an armature for a rotating electrical machine according to the present invention will be described. In the present embodiment, the description will be given about an exemplary case where the armature for a rotating electrical machine according to the present invention is applied to a stator 2 of a rotating electrical machine 1. FIG. 1 is a cross-sectional view showing the overall structure of the rotating electrical machine 1 according to the present embodiment, and FIG. 2 is a perspective view showing the overall structure of the stator 2 according to the present embodiment. The stator 2 according to the present embodiment is characterized by the combination of the stator core shape and the coil shape in order to improve the space factor of coils 21 in slots 12 of a stator core 11 and at the same time to reduce the eddy-current loss. In the following, the structure of each part of the rotating electrical machine 1 will be described in detail.

Overall Structure of Rotating Electrical Machine

As shown in FIG. 1, the rotating electrical machine 1 includes the stator 2, a rotor 3, and a case 5. The stator 2 includes the coils 21. By allowing a current to pass through the coils 21, a magnetic field can be generated. In the present embodiment, the stator 2 corresponds to an "armature for a rotating electrical machine" of the present invention. The stator 2 is fixed to an inner circumferential surface of the case 5. The structure of the stator 2 will be detailed later. On the radially inner side of the stator 2, the rotor 3 serving as a field that has a permanent magnet (not shown) is arranged so as to be relatively rotatable to the stator 2 with a rotor shaft 4 as a rotation axis. In other words, the rotating electrical machine 1 in the present embodiment is an inner rotor type rotating electrical machine having the stator 2 as an armature. The case 5 is shaped cylindrically, having an end wall 5a provided on one longitudinal side. The case 5 opens toward the other longitudinal side. So as to close the opening, a cover 6 is attached to the case 5. At the radial centers of the end wall 5a and the cover 6 of the case 5, bearings 7 are provided. The rotor 3 and the rotor shaft 4 are held via the bearings 7 so as to be rotatable relative to the case 5 and the cover 6.

Structure of Stator

As shown in FIG. 2, the stator 2 includes the stator core 11 and the coils 21. The stator core 11 is shaped substantially cylindrically with a plurality of laminated annular plate-like magnetic steel sheets. The stator core 11 is provided on its inner circumferential surface with a plurality of slots 12, which extends in the longitudinal direction L of the stator core 11 and are dispersedly arranged at prescribed circumferential intervals in the circumferential direction C. In the present embodiment, the stator core 11 corresponds to a "core" of the present invention. The slots 12 are identical to one another in the cross section, and have prescribed width and depth. In the present embodiment, the stator core 11 is provided with a total of forty-eight slots 12 along its whole circumference. Each of the slots 12 is formed to have an inner circumferential opening 13 opening inwardly in the radial direction R of the stator core 11.

Figure 3A:
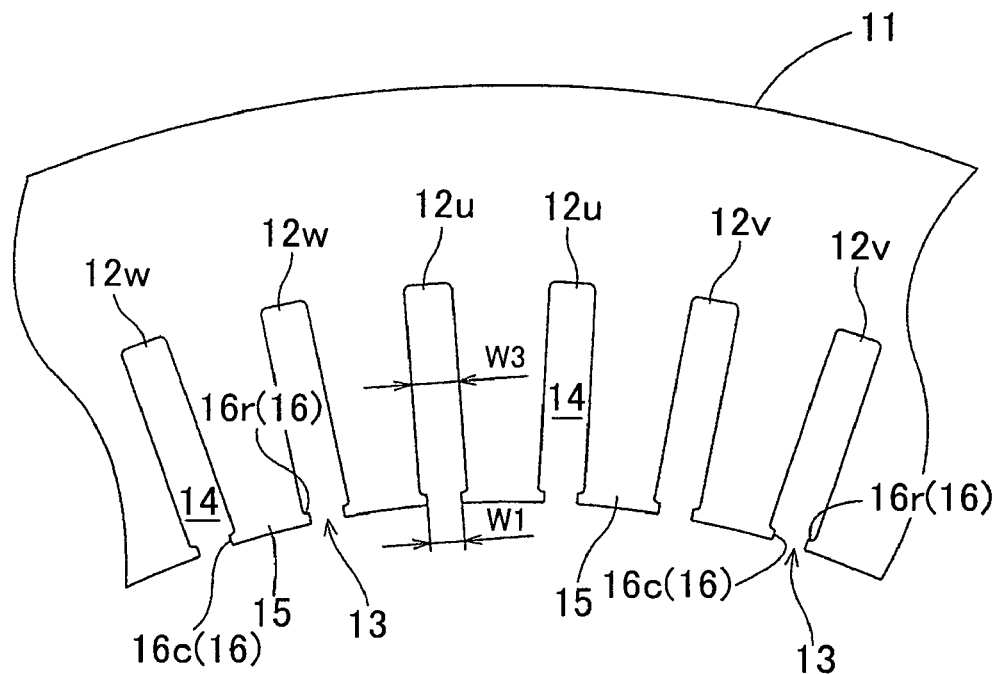
FIGS. 3A and 3B are plan views showing the stator according to the first embodiment of the present invention.

As shown in FIG. 3A, a tooth 15 is provided between any adjacent slots 12 of the stator core 11. That means, one slot 12 is provided between any adjacent teeth 15. At a tip of each tooth 15 extending inward in the radial direction R, projections 16 projecting in the circumferential direction C are provided on opposite sides in the circumferential direction C of the tooth 15. In the present embodiment, each of the projections 16 is substantially rectangular in the cross section taken perpendicularly to the longitudinal direction L, and integrally formed with the tooth 15 so as to be continuous in the longitudinal direction L. Then, between two projections 16 respectively located at two adjacent teeth 15 so as to face each other in the circumferential direction C, the inner circumferential opening 13 is formed. It is to be noted that a space in each of the slots 12 that is located on outer side in the radial direction R of the inner circumferential opening 13 is a slot interior 14.

As described in the foregoing, the inner circumferential openings 13 are each formed between the two projections 16 respectively located at the two adjacent teeth 15 and facing each other in the circumferential direction C. Accordingly, each of the slots 12 of the stator core 11 in the present embodiment is a semi-open slot, in which a circumferential width W1 of each inner circumferential opening 13 opening inwardly in the radial direction R is formed to be smaller than a circumferential width W3 of each slot interior 14. Linear conductors 31 forming the coils 21 are arranged in the slot interiors 14, so that the coils 21 are wound around the slots 12. Here, as will be described later, slot-internal insulation sheets 42 are arranged between the slots 12 and the coils 21.

The stator 2 is provided with the coils 21 of a plurality of phases that are different from one another. The stator 2 in the present embodiment is a stator used in the rotating electrical machine 1 driven by three-phase alternating current, and provided with three-phase coils 21 of U, V and W phases. Here, the coils 21 of respective phases are formed with linear conductors 31. In the present embodiment, each linear conductor 31 is formed with a single rectangular wire whose cross section is substantially rectangular. In the present embodiment, in order to maximize the space factor of the coils 21 in relation to the size of the slots 12, each linear conductor 31 is formed such that its circumferential width W5 is substantially identical to the circumferential width W3 of each slot interior 14. More specifically, the circumferential width W5 of each linear conductor 31 is set to a substantially equal value to the circumferential width W3 of each slot interior 14, on the precondition that the coils 21 formed using the linear conductors 31 can physically be inserted into the slot interiors 14. Thus, by improving the space factor of the coils 21, an improvement in the energy efficiency of the rotating electrical machine 1 is intended. As has been described, in the present embodiment, the slots 12 of the stator core 11 are each a semi-open slot, in which the circumferential width W1 of each inner circumferential opening 13 is smaller than the circumferential width W3 of each slot interior 14. Accordingly, the circumferential width W5 of each linear conductor 31 that is substantially equal to the circumferential width W3 of each slot interior 14 is formed to be larger than the circumferential width W1 of the inner circumferential opening 13 of each slot 12. Therefore, in the present embodiment, radial conductor portions 25 in curved coil end portions 24 of the coils 21 are structured to each have a narrow-width concave portion 32 whose circumferential width W7 is smaller than the circumferential width W1 of the inner circumferential opening 13 of each of the slots 12. Details thereof will be described later.

Figure 4:
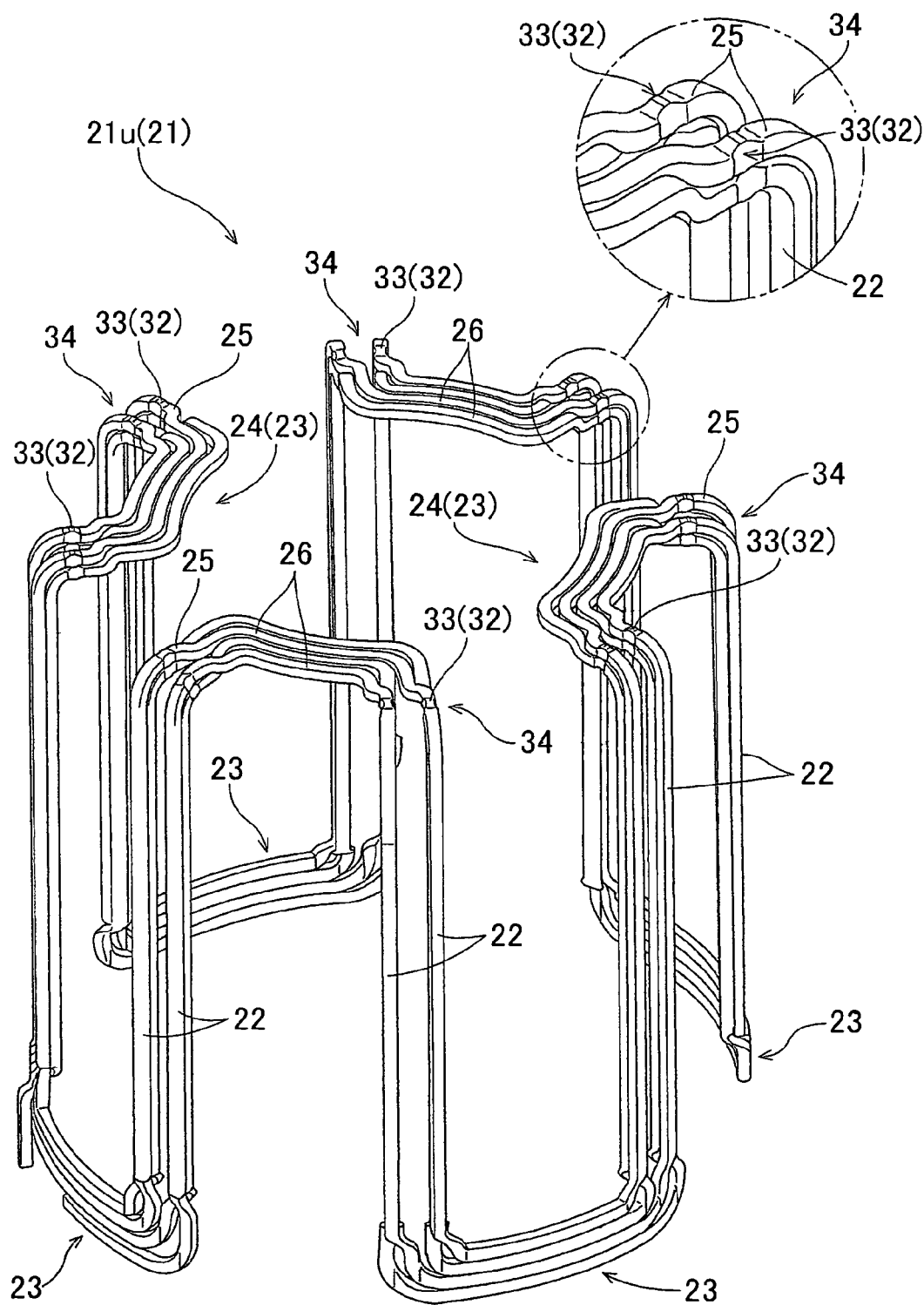
FIG. 4 is a perspective view showing a coil of the stator according to the first embodiment of the present invention.

The coils 21 of respective phases are each formed into a prescribed shape. In the present embodiment, as shown in FIG. 4, each of the coils 21 is formed into a wavelike shape so as to form, as a whole, a substantially cylindrical shape. It is to be noted that only a U-phase coil 21$u$ is shown in FIG. 4. The coils 21 each include coil side portions 22 arranged in the slots 12, and coil end portions 23 connecting the coil side portions 22 arranged in one slot 12 to a pair of the coil side portions 22 arranged in a different slot 12 at opposite ends in the longitudinal direction L of the stator core 11. The coil side portions 22 are linearly formed so as to extend in the longitudinal direction L, conforming to the shape of respective slot interiors 14. The coil end portions 23 are formed to extend in the circumferential direction C, connecting between the pairs of coil side portions 22 arranged in different slots 12. As shown in FIG. 2, the coil end portions 23 are arranged to project in the longitudinal direction L respectively from opposite ends in the longitudinal direction L of the stator core 11. As shown in FIG. 4, the coils 21 are each formed into a wavy shape taking rounds in the circumferential direction C of the stator core 11, in which the coil side portions 22 extending in the longitudinal direction L and arranged in order in the plurality of slots 12 are connected alternately at the coil end portions 23 on one and the other sides in the longitudinal direction L. Thus, the coils 21 of respective phases are preformed to be wave-wound on the stator core 11 in a state where the coil side portions 22 are arranged in respective corresponding slots 12.

Further, in the present embodiment, each of the coils 21 is so structured that two of the coil side portions 22 arranged in the identical slot 12 form one set. The set of two coil side portions 22 is formed by single continuous linear conductor 31 taking two rounds in the circumferential direction C of the stator core 11. Still further, two sets of such two coil side portions 22 constituting one identical phase coil 21 are arranged parallel to each other in the circumferential direction C such that the two sets are arranged in respective adjacent slots 12. The two sets of coil side portions 22 are connected to be continuous at prescribed positions in the coil end portions 23. Accordingly, the coil 21 shown in FIG. 4 is formed by single continuous linear conductor 31 taking four rounds in the circumferential direction C of the stator core 11. In the present embodiment, three sets of the coils 21 each having substantially the same shape as shown in FIG. 4 are arranged adjacent to one another in the radial direction R in the same slot 12. Accordingly, in each of two adjacent slots 12, six coil side portions 22 are arranged juxtaposed in the radial direction R to be aligned in one row in the slot 12.

While FIG. 4 shows only the U-phase coil 21$u$, the V-phase coil 21$v$ and W-phase coil 21$w$ are also structured to have the similar shape. For each of the V-phase coil 21$v$ and the W-phase coil 21$w$ also, three sets thereof are arranged adjacent to one another in the radial direction R in the same slot 12, and in each of two adjacent slots 12, six coil side portions 22 of the same phase are arranged juxtaposed in the radial direction R to be aligned in one row in the slot 12.

Figure 3B:
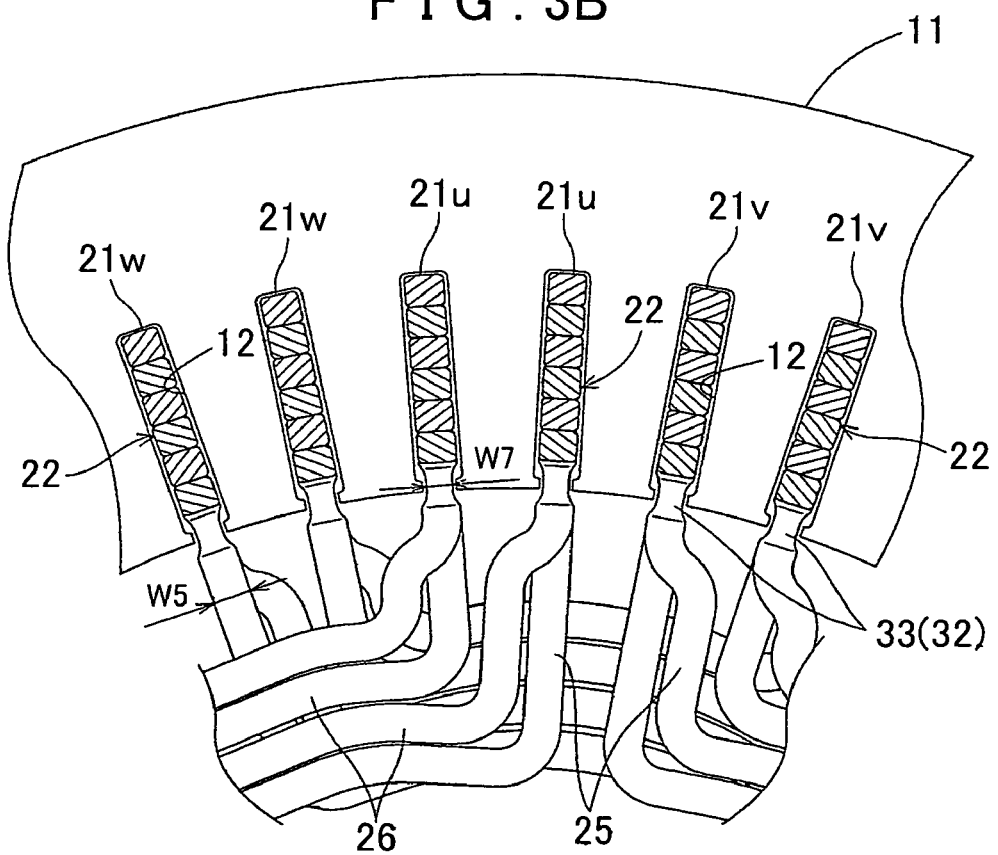

As shown in FIG. 3B, in the stator core 11, two adjacent U-phase slots 12$u$, two adjacent V-phase slots 12$v$ and two adjacent W-phase slots 12$w$ are repeatedly formed in order. Then, respective coil side portions 22 of the U-phase coil 21$u$, V-phase coil 21$v$ and W-phase coil 21$w$ in the shape shown in FIG. 4 are respectively arranged in the U-phase slots 12$u$, the V-phase slots 12$v$ and the W-phase slots 12$w$ in order on a two slot-by-two slot basis in the circumferential direction C.

Figure 6:
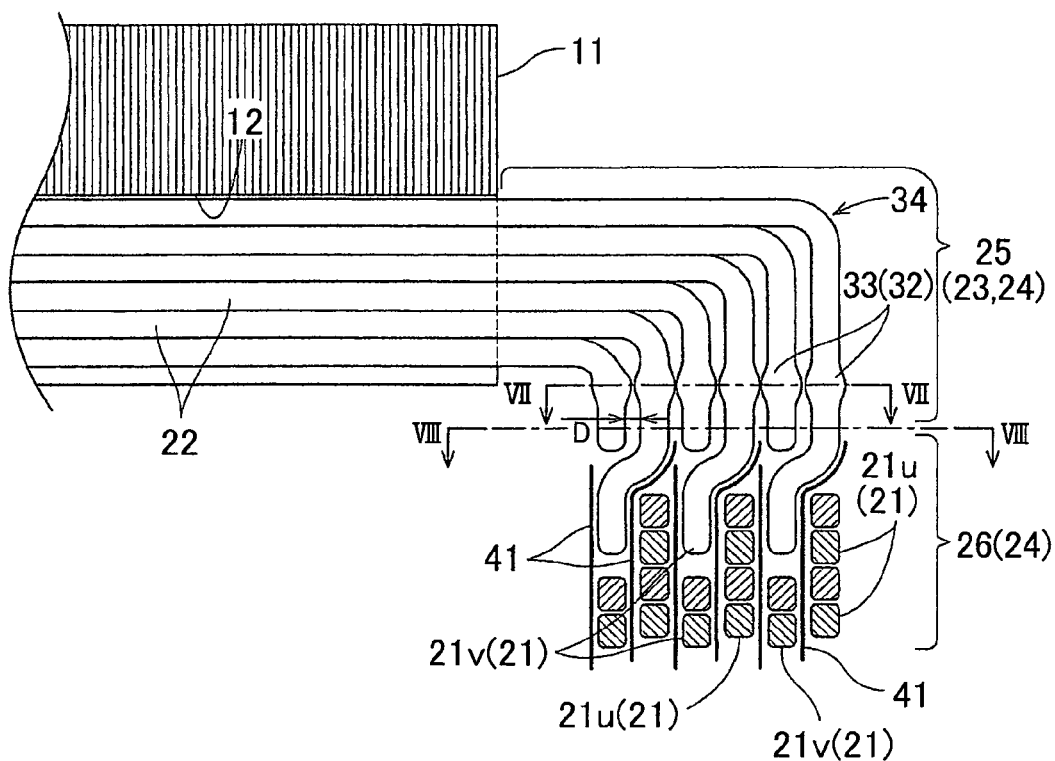
FIG. 6 is a cross-sectional view taken along line VI-VI in FIG. 5.

Among the coil end portions 23 of the coils 21 of respective phases, which are located at the opposite ends in the longitudinal direction L of the stator core 11, the coil end portions 23 on one side in the longitudinal direction L (the top side in FIG. 2) are curved coil end portions 24, which are formed as curved inwardly in the radial direction R. As shown in FIG. 6, the curved coil end portions 24 are each curved inwardly in the radial direction R at curved portions 34, substantially perpendicularly to the coil side portions 22. As also shown in FIGS. 3B and 4, the curved coil end portions 24 each include the radial conductor portions 25 extending in the radial direction R from the coil side portions 22, and a circumferential conductor portion 26 connecting, in the circumferential direction C, between a pair of the radial conductor portions 25 to each other, on the inner side in the radial direction R of the inner circumferential openings 13 of the slots 12.

In the present embodiment, the linear conductor 31 forming each of the radial conductor portions 25 is formed to extend from the coil side portion 22 in the longitudinal direction L of the stator core 11, and then to be curved inwardly in the radial direction R. As has been mentioned above, the six linear conductors 31 forming the coil side portions 22 are arranged to align in one row in the radial direction R in each slot 12. Therefore, at each of the radial conductor portions 25, the six linear conductors 31 are arranged in an aligned manner such that the six linear conductors 31 substantially parallel to the longitudinal direction L are curved inwardly in the radial direction R so as to be substantially parallel to the radial direction R, while being kept aligned in one row. Thus, the radial conductor portions 25 are arranged to be juxtaposed to one another in the longitudinal direction L. It is to be noted that, as can be seen in FIGS. 2 and 3B, the radial conductor portions 25 are arranged so that they do not overlap with one another in the circumferential direction C, at least at portions on the outer side in the radial direction R relative to the inner circumferential openings 13 of the slots 12 of the stator core 11. The radial conductor portions 25 extend inwardly in the radial direction R at least with respect to the inner circumferential surface of the stator core 11. In the present embodiment, among the linear conductors 31 forming the curved coil end portions 24, the portions that are the same as the coil side portions 22 in terms of position in the circumferential direction C are designated as the radial conductor portions 25.

The linear conductor 31 forming each of the circumferential conductor portions 26 is formed to extend from the radial conductor portion 25 corresponding to one slot 12 toward the radial conductor portion 25 corresponding to the other slot 12 while being curved in the circumferential direction C, and then to be bent outwardly in the radial direction R so as to be connected to the radial conductor portion 25 corresponding to the other slot 12. As has been mentioned above, the radial conductor portions 25 extend inwardly in the radial direction R at least with respect to the inner circumferential surface of the stator core 11. Therefore, the circumferential conductor portions 26 are arranged inwardly in the radial direction R with respect to the inner circumferential surface of the stator core 11. Here, out of the six linear conductors 31 arranged to be aligned in one row in the radial direction R in each slot 12, two linear conductors 31 arranged on the outer side in the radial direction R are arranged to be juxtaposed to each other in the radial direction R at the circumferential conductor portions 26. Then, such two linear conductors 31 arranged on the outer side in the radial direction R in each of two adjacent slots 12 of the same phase, i.e., a total of four linear conductors 31, are arranged to be juxtaposed to one another in the radial direction R at the circumferential conductor portions 26. Further, out of the six linear conductors 31 arranged to be aligned in one row in the radial direction R in each slot 12, two linear conductors 31 arranged on the inner side in the radial direction R are arranged to be juxtaposed to each other in the radial direction R. Then, such two linear conductors 31 arranged on the inner side in the radial direction R in each of two adjacent slots 12 of the same phase, i.e., a total of four linear conductors 31, are arranged to be juxtaposed to one another in the radial direction R at the circumferential conductor portions 26. Still further, out of the six linear conductors 31 arranged to be aligned in one row in the radial direction R in each slot 12, the remaining two linear conductors 31 are arranged to be juxtaposed to each other in the radial direction R. Then, such two remaining linear conductors 31 arranged in each of two adjacent slots 12 of the same phase, i.e., a total of four linear conductors 31, are arranged to be juxtaposed to one another in the radial direction R at the circumferential conductor portions 26. These three sets of four linear conductors 31 arranged to be juxtaposed to one another in the radial direction R are so arranged that the one continuing from the coil side portion 22 arranged on the outer side in the radial direction R in each slot 12 is located nearer to the one side in the longitudinal direction L.

Figure 5:
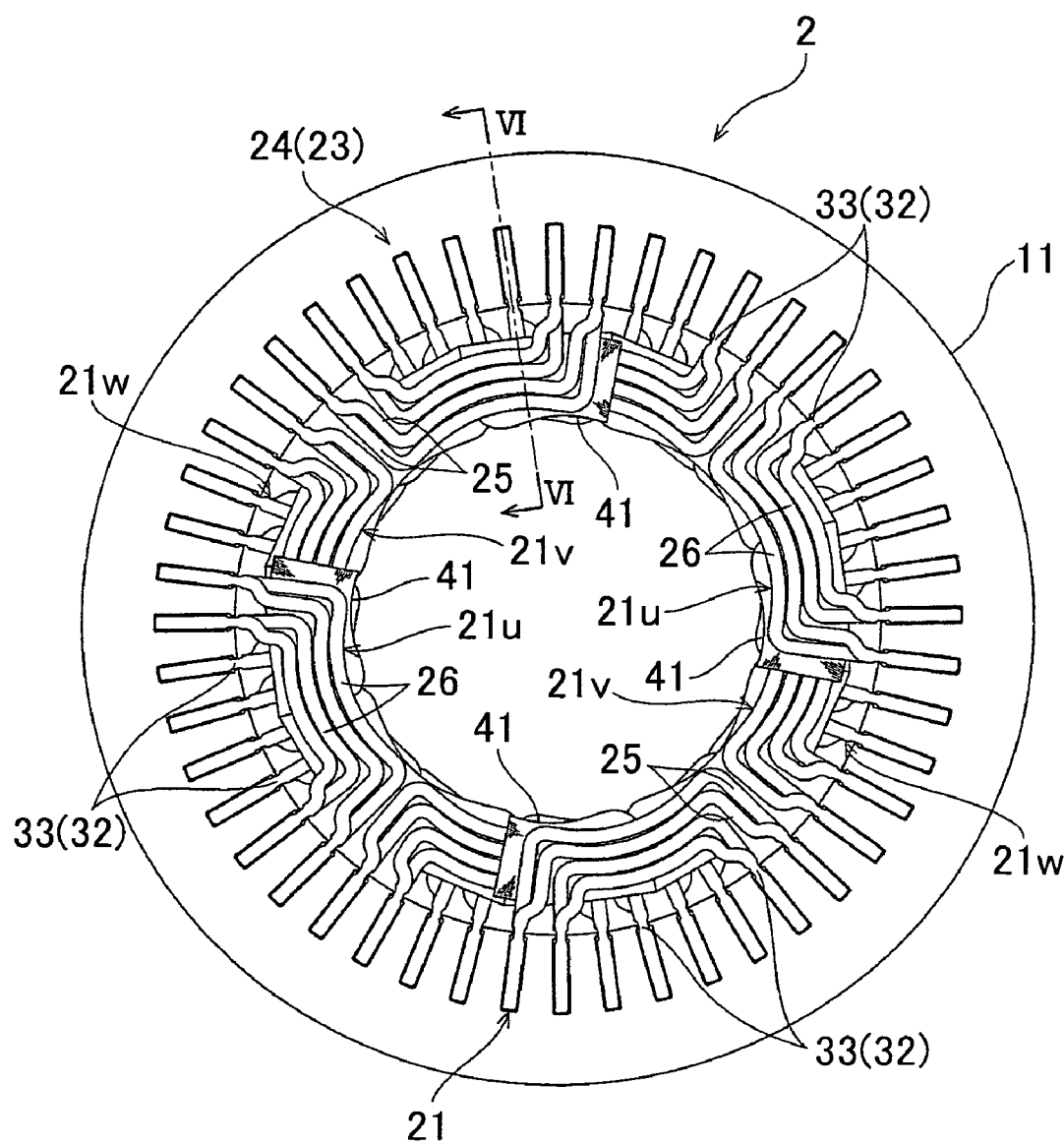
FIG. 5 is a plan view of the stator according to the first embodiment of the present invention in a state where phase-to-phase insulation sheets are arranged.

At the curved coil end portions 24 of coils 21 of respective phases, linear conductors 31 respectively forming the coils 21 of different phases are adjacently arranged, so as to be juxtaposed in the longitudinal direction L, in the circumferential conductor portions 26. In the present embodiment, as shown in FIGS. 5 and 6, the linear conductor 31 forming the U-phase coil 21u is arranged adjacently to the linear conductors 31 forming the V-phase coil 21v and the W-phase coil 21w, on one side (the right side in FIG. 6) in the longitudinal direction L. The linear conductor 31 forming the V-phase coil 21v is arranged adjacently to the linear conductor 31 forming the W-phase coil 21w on one side in the longitudinal direction L, at a region where it overlaps with the W-phase coil 21w in the circumferential direction C. Additionally, the linear conductor 31 forming the V-phase coil 21v is arranged adjacently to the linear conductor 31 forming the U-phase coil 21u on the other side in the longitudinal direction L, at a region where it overlaps with the U-phase coil 21u in the circumferential direction C. The linear conductor 31 forming the W-phase coil 21w is arranged adjacently to the linear conductors 31 forming the U-phase coil 21u and the V-phase coil 21v on the other side in the longitudinal direction L.

As shown in FIGS. 5 and 6, phase-to-phase insulation sheets 41 are each interposed between respective linear conductors 31 forming the circumferential conductor portions 26 of the coils 21 of respective different phases and being adjacent to one another in the longitudinal direction L at the curved coil end portions 24, so as to ensure electrical insulation among them. As the phase-to-phase insulation sheets 41, sheets formed with a material having excellent electrical insulation property and heat resistance, e.g., aramid fibers and polyethylene terephthalate bonded to each other, may be used.

Structure of Radial Conductor Portion

Next, the structure of the radial conductor portions 25 of the curved coil end portions 24 of respective coils 21 will be described. As shown in FIGS. 3B and 4, each radial conductor portion 25 has the narrow-width concave portion 32 whose circumferential width W7 is smaller than the circumferential width W1 of the inner circumferential opening 13 of each of the slots 12. The narrow-width concave portion 32 is provided in the radial conductor portion 25 at a radial position corresponding to the inner circumferential opening 13 of any one of the slots 12. It is to be noted that the circumferential width of the radial conductor portion 25 except for the narrow-width concave portion 32 is equal to the circumferential width W5 of the linear conductor 31 forming each coil 21, and accordingly, larger than the circumferential width W1 of the inner circumferential opening 13 of the slot 12. In other words, the radial conductor portions 25 are provided with, at the radial positions corresponding to the inner circumferential openings 13 of the slots 12, the narrow-width concave portions 32 that are each recessed relative to the other portions of the radial conductor portions 25.

The narrow-width concave portions 32 are each formed so that, as seen in the longitudinal direction L, its outer shape conforms to the outer shape of the projections 16 arranged at the tips of the teeth 15 inwardly extending in the radial direction R of the stator core 11. In other words, at the radial conductor portions 25, the narrow-width concave portions 32 are each so formed that only the portion around the radial position corresponding to the inner circumferential opening 13 of each slot 12 is recessed. Here, the circumferential width W7 of each narrow-width concave portion 32 is formed to be smaller than the circumferential width W1 of the inner circumferential opening 13 of each slot 12. Thus, only at the radial position in each of the radial conductor portions 25 corresponding to the inner circumferential opening 13 of the slot 12, the narrow-width concave portion 32 whose circumferential width W7 is smaller than the circumferential width W1 of the inner circumferential opening 13 is formed. It is to be noted that, since only the prescribed position in each of the radial conductor portions 25 is formed as the narrow-width concave portion 32, the only sites to be processed in each coil 21 are the sites that correspond to the inner circumferential openings 13. Therefore, the processing can be carried out more easily.

Thus, since each of the radial conductor portions 25 is provided, at its radial position corresponding to the inner circumferential opening 13 of each slot 12, with the narrow-width concave portion 32 having the shape conforming to the outer shape of the projections 16, there are no overlap between the projections 16 provided at the tips of the teeth 15 inwardly extending in the radial direction R of the stator core 11 and the linear conductor 31 forming each coil 21, as seen in the longitudinal direction L. Accordingly, as in the present embodiment even when the stator 2 is structured using the semi-open slot type stator core 11, together with the coils 21 each formed with the linear conductor 31 having the circumferential width W5 that is substantially equal to the circumferential width W3 of each slot interior 14 of the stator core 11, by allowing the narrow-width concave portion 32 to pass through the inner circumferential opening 13 of each slot 12 of the stator core 11, the coils 21 can be inserted in the longitudinal direction L from the curved coil end portion 24 side into the slots 12.

Here, in the present embodiment, each of the linear conductors 31 is formed with a single rectangular wire and is formed such that its circumferential width W5 is substantially equal to the circumferential width W3 of each slot interior 14. Therefore, as compared with a case where each coil 21 is formed with an assembly of fine linear conductors, e.g., a bundle of a plurality of fine linear conductors, the space factor of each coil 21 in the slot interior 14 can be improved.

Additionally, in the present embodiment, each of the slots 12 of the stator core 11 is a so-called semi-open slot, in which the circumferential width W1 of the inner circumferential opening 13 is smaller than the circumferential width W3 of the slot interior 14. Therefore, when the rotor 3 rotates, the volume of the magnetic flux from the permanent magnet of the rotor 3 reaching the surface of the linear conductors 31 forming the coils 21 can be reduced. Hence, generation of an eddy current on the surface of the linear conductors 31 can be suppressed, whereby the eddy-current loss can be reduced.

Accordingly, the structure of the stator 2 according to the present embodiment achieves both an improvement in the space factor of the coils and a reduction in the eddy-current loss.

Here, in the present embodiment, the narrow-width concave portions 32 are compressive shaped portions 33 which are each formed by compressing in the circumferential direction C a portion extending in the radial direction R of each of the radial conductor portions 25. As shown in FIGS. 4 and 6, the radial conductor portions 25 are each compressed in the circumferential direction C and extended in the longitudinal direction L at the compressive shaped portion 33. The portions extended in the longitudinal direction L of the compressive shaped portions 33 is arranged to be juxtaposed to one another in the longitudinal direction L. In other words, the narrow-width concave portions 32 are arranged to be juxtaposed to one another in the longitudinal direction L. In the present embodiment, the compressive shaped portions 33 are each compressed in the circumferential direction C and extended in the longitudinal direction L, such that, across the entire radial direction R of each of the compressive shaped portions 33, the area of the cross section of each compressive shaped portion 33 taken perpendicularly to the current passing direction of the coil 21 is substantially equal to the cross-sectional area of the other sites except for the compressive shaped portion 33. Thus, the area of the cross section of any coil taken perpendicularly to the current passing direction can be maintained to be substantially constant over the entire coils 21. Accordingly, the electric resistance in the compressive shaped portions 33 can be substantially equal to that in the sites except for the compressive shaped portions 33. Accordingly, it is possible to prevent disadvantageous events such as an increase in the amount of heat generated locally in the compressive shaped portions 33.

Figure 7:
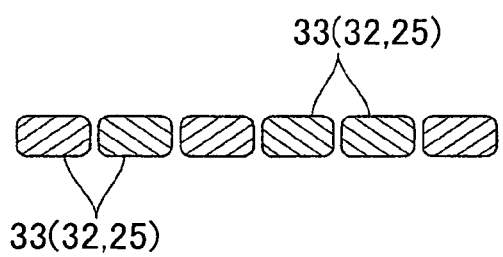
FIG. 7 is a cross-sectional view taken along line VII-VII in FIG. 6.
Figure 8:
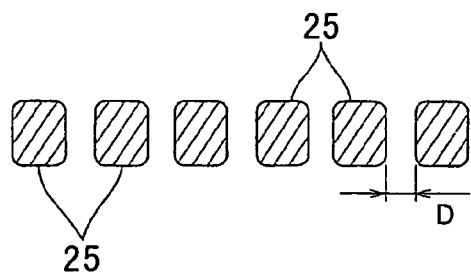
FIG. 8 is a cross-sectional view taken along line VIII-VIII in FIG. 6.

Additionally, owing to the fact that the compressive shaped portions 33 are each formed to extend in the longitudinal direction L and that the portions extended in the longitudinal direction L of the compressive shaped portions 33 are arranged to be juxtaposed to one another in the longitudinal direction L, as shown in FIG. 6, the compressive shaped portions 33 have respective extended portions in the longitudinal direction L abutting on one another in the longitudinal direction L, thereby repelling one another. As a result, as can be seen in FIGS. 7 to 9, in the sites in the curved coil end portions 24 except for the compressive shaped portions, a longitudinal direction interval D between the linear conductors 31 adjacent to one another in the longitudinal direction L is formed wide without need to provide any particular spacer or the like. As a result, for example, when a coolant is introduced to flow between the linear conductors 31 so as to cool the curved coil end portions 24, the flow of the coolant between the linear conductors 31 is facilitated and the heat exchange efficiency is improved, and accordingly the cooling efficiency is improved.

As has been mentioned above, the phase-to-phase insulation sheets 41 are each interposed between respective linear conductors 31 respectively forming different phase coils 21 and being adjacent to one another in the longitudinal direction L at the curved coil end portions 24. As shown in FIGS. 5 and 6, the phase-to-phase insulation sheets 41 are arranged on the inner side in the radial direction R of the compressive shaped portions 33 formed at the radial conductor portions 25. Here, as noted above, owing to the fact that the compressive shaped portions 33 are each formed to extend in the longitudinal direction L and that the portions extended in the longitudinal direction L of the compressive shaped portions 33 are arranged to be juxtaposed to one another in the longitudinal direction L, the longitudinal direction interval D between the linear conductors 31 adjacent to one another in the longitudinal direction L is formed wide. Hence, the insulation performance required for the phase-to-phase insulation sheets 41 can be lowered, and therefore the manufacturing costs can be reduced. Additionally, the stress applied on the phase-to-phase insulation sheets 41 between respective linear conductors 31 in the longitudinal direction L can be reduced, and therefore a steady insulation quality can be achieved.

Manufacturing Method of Stator

Next, a manufacturing method of the stator 2 according to the present embodiment will be described. The manufacturing method of the stator 2 according to the present embodiment includes a core forming step, a coil preforming step, a compressing step, an inserting step, and a latching step, through which the stator 2 according to the present embodiment can be manufactured. In the following, these steps will be described in detail.

The core forming step is a step of forming the stator core 11. In the core forming step, first, a plurality of thin-plate shaped magnetic steel sheets are each formed into an annular plate-like prescribed shape (the semi-open slot type shape described in the foregoing). Here, the magnetic steel sheets are formed into the identical shape. The plurality of magnetic steel sheets in the identical shape are laminated in the longitudinal direction L and supported by a cylindrical core holder (not shown) and fixed. Thus, the stator core 11 is formed.

The coil preforming step is a step of preforming the coils 21 of respective phases. In the coil preforming step, with a single linear conductor 31 formed with a rectangular wire and by using a prescribed coil forming jig (not shown), each of the coils 21 of respective phases having the prescribed shape (the wave-wound shape mentioned above) is formed. As to each of the coils 21 of respective phases formed in the coil preforming step, when the coil side portions 22 extending in the longitudinal direction L are curved inwardly in the radial direction R to be the radial conductor portions 25, or when the radial conductor portions 25 extending outwardly in the radial direction R are curved in the longitudinal direction L to be the coil side portions 22, there are cases in which a bulge projecting in the circumferential direction C may be developed in each of the curved portions 34 connecting the coil side portions 22 and the radial conductor portions 25 of the curved coil end portions 24 to each other. In such a case, the circumferential width of the bulge may possibly become larger than the circumferential width W5 of the linear conductor 31 forming each coil 21. Such an event is prone to occur particularly, as in the present embodiment, when forming each coil 21 with the linear conductor 31 whose circumferential width W5 is substantially equal to the circumferential width W3 of the slot interior 14 for the purpose of improving the space factor of the coils 21 in each slot interior 14.

The compressing step is a step of shaping the linear conductors 31 forming the coils 21 of respective phases having been preformed in the coil preforming step, by compressing into a prescribed shape. In the present embodiment, a narrow-width concave portion forming step is carried out in the present compressing step. In the narrow-width concave portion forming step, the narrow-width concave portions 32 that is recessed relative to the other portions of the radial conductor portions 25 such that the circumferential width of each narrow-width concave portion 32 is smaller than the circumferential width W1 of each inner circumferential opening 13 is formed, at a radial position corresponding to each inner circumferential opening 13 in each of the radial conductor portions 25 extending radially from the coil side portions 22 in the curved coil end portions 24. In the compressing step, by compressing in the circumferential direction C the bulge developed in each of the curved portions 34 in the coils 21 of respective phases, the bulge is shaped to have the circumferential width that is substantially equal to the circumferential width W5 of each linear conductor 31. Further, in the compressing step, the radial conductor portions 25 are each compressed in the circumferential direction C at the radial direction R position corresponding to the inner circumferential opening 13 of each slot 12 of the stator core 11, such that the radial conductor portion 25 is shaped to have the circumferential width W7 that is smaller than the circumferential width W1 of the inner circumferential opening 13. In other words, in the compressing step, the site in each of the radial conductor portions 25 corresponding to the inner circumferential opening 13 are compressed in the circumferential direction C. Here, "the site in each of the radial conductor portions 25 corresponding to the inner circumferential opening 13" refers to "the site in each of the radial conductor portions 25 where the radial conductor portion 25 and the inner circumferential opening 13 correspond to each other in terms of the radial position". By the foregoing, compressive shaped portions 33 serving as the narrow-width concave portions 32 are formed.

Here, the curved portions 34 are each positioned at the site connecting the coil side portion 22 and the radial conductor portion 25 to each other, and as can be seen in FIGS. 4 and 9, the radial direction R position in the radial conductor portion 25 corresponding to the inner circumferential opening 13 and the curved portion 34 are positioned close to each other in the same linear conductor 31. Additionally, these sites are both shaped by being compressed in the circumferential direction C. Accordingly, in the present embodiment, simultaneously with compressing in the circumferential direction C of the bulge developed in each curved portion 34, the radial direction R position in each radial conductor portion 25 corresponding to the inner circumferential opening 13 is compressed in the circumferential direction C to form the compressive shaped portion 33 in the compressing step. In other words, simultaneously with compressing in the circumferential direction C the radial direction R position in each radial conductor portion 25 corresponding to the inner circumferential opening 13 to form the compressive shaped portion 33, the bulge developed in each curved portion 34 is also compressed in the circumferential direction C. In this way, the radial conductor portion 25 and the curved portion 34 formed close to each other in the same linear conductor 31 can both be compressed in the circumferential direction C in a single step, the stator 2 can be manufactured without an increase in the number of steps.

It is to be noted that, when shaping each of the radial conductor portions 25 and the curved portions 34 by compressing in the circumferential direction C, a pair of molds (not shown) can be used for example, that has, on their planes to face parallel to each other, protrusions corresponding to the cross-sectional shape of the projections 16 provided at the teeth 15 of the stator core 11. In other words, by abutting and pressing the molds from opposing sides in the circumferential direction C on the linear conductor 31 forming the radial conductor portion 25 and the curved portion 34, each compressive shaped portion 33 can be formed and also the circumferential width of the curved portion 34 can be adjusted.

The inserting step is a step of inserting in the longitudinal direction L the coils 21 of respective phases shaped into a prescribed shape through the compressing step into the slots 12 of the stator core 11. In other words, the inserting step is a step of inserting in the longitudinal direction L the coils 21 into the slots 12 from the curved coil end portion 24 side, while the narrow-width concave portions 32 formed in the narrow-width concave portion forming step are aligned at the inner circumferential openings 13. Here, at the stage where the compressing step is finished, the compressive shaped portions 33 are provided at the radial conductor portions 25 and the circumferential width of each curved portion 34 is adjusted to be substantially equal to the circumferential width W5 of each linear conductor 31. As such, the stator core 11 and the linear conductors 31 forming the coils 21 of respective phases form a structure in which they do not overlap with each other, as seen in the longitudinal direction L. In the present inserting step, as shown in FIGS. 10 and 11, the coils 21 are inserted in the longitudinal direction L into the slots 12 from the curved coil end portion 24 side in a state where the compressive shaped portions 33 as the narrow-width concave portions 32 in respective radial conductor portions 25 and the inner circumferential openings 13 of the slots 12 of the stator core 11 are corresponded to each other.

As has been described in the foregoing, in the present embodiment, the coils 21 of respective phases are preformed such that the coil side portions 22 are in the wave-wound shape in which they can be arranged in respective corresponding slots 12. By preforming the coils 21 of respective phases into a prescribed shape in such a manner, the coils 21 can easily be inserted in the longitudinal direction L into the slots 12. Accordingly, the workload in mounting the coils 21 of respective phases on the stator core 11 can be reduced.

Figure 10:
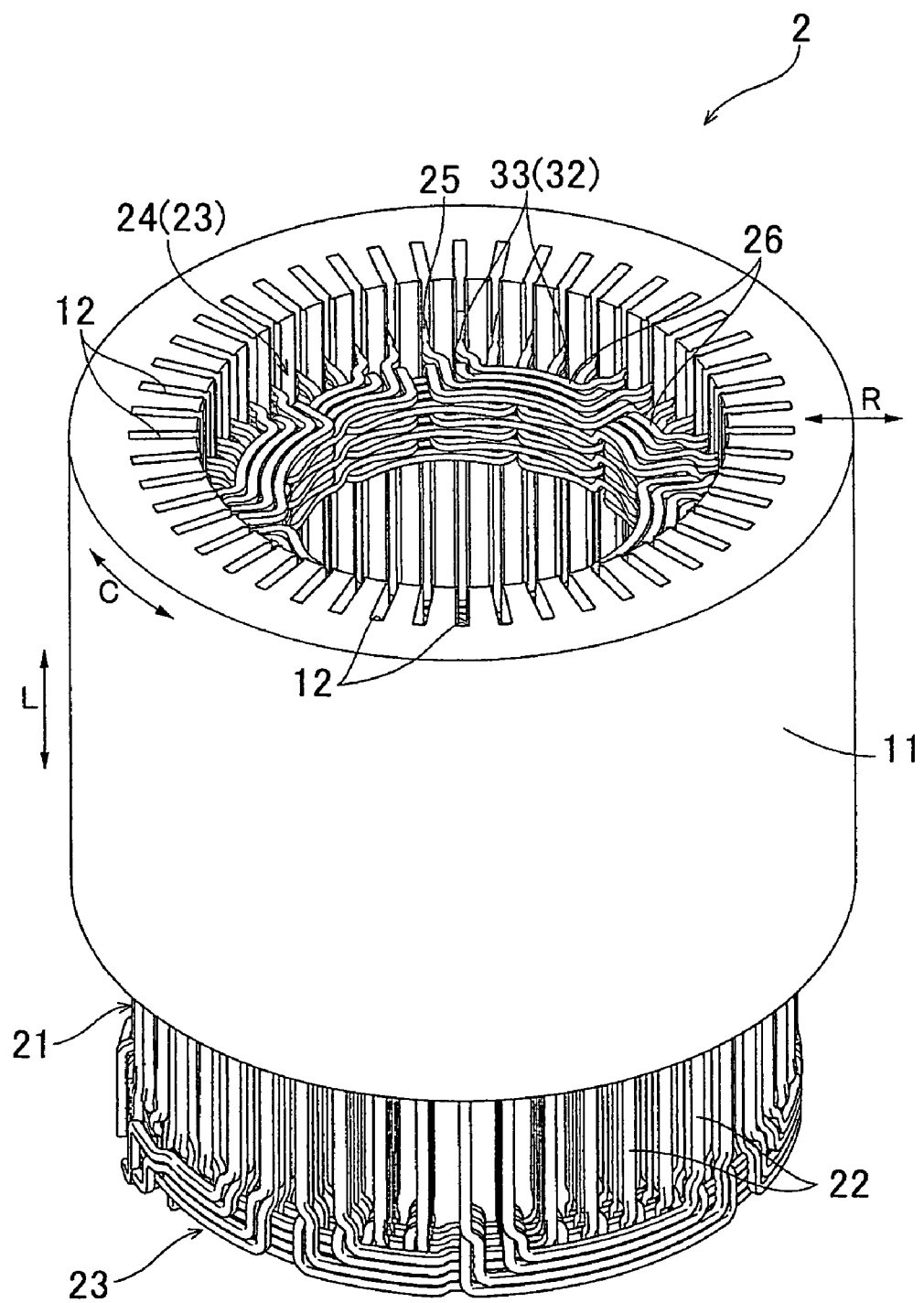
FIG. 10 is a perspective view showing one manner of an inserting step for manufacturing the stator according to the first embodiment of the present invention.

Here, in the present embodiment, as shown in FIG. 10, the coils 21 of respective U, V and W phases are combined into one unit, and in a state where the coil side portions 22 are aligned at respective corresponding slots 12 to be arranged therein, the unit is inserted into the slots 12 in an integrated manner. Note that, it is also possible to form three sub-units by combining the coils 21 of respective U, V and W phases each having the shape shown in FIG. 4 and to be arranged at the same radial direction R position in the slots 12, and in a state where the coil side portions 22 are aligned at respective corresponding slots 12 to be arranged therein, the sub-units may be inserted into the slots 12 in order, each in an integrated manner. In this case, the sub-units are inserted in order of radial direction R position in the slots 12 from the outermost to the innermost. Alternatively, each of the coils 21 shaped as shown in FIG. 4 may be inserted into the slots 12 in order one by one, so that the coil side portions 22 are arranged in respective corresponding slots 12. In this case, the coils 21 are inserted in order of radial direction R position of the coil side portions 22 in the slots 12 from the outermost to the innermost and of longitudinal direction L position of the circumferential conductor portions 26 of the curved coil end portions 24 from the furthest on one side in the longitudinal direction L to the nearest.

Figure 11:
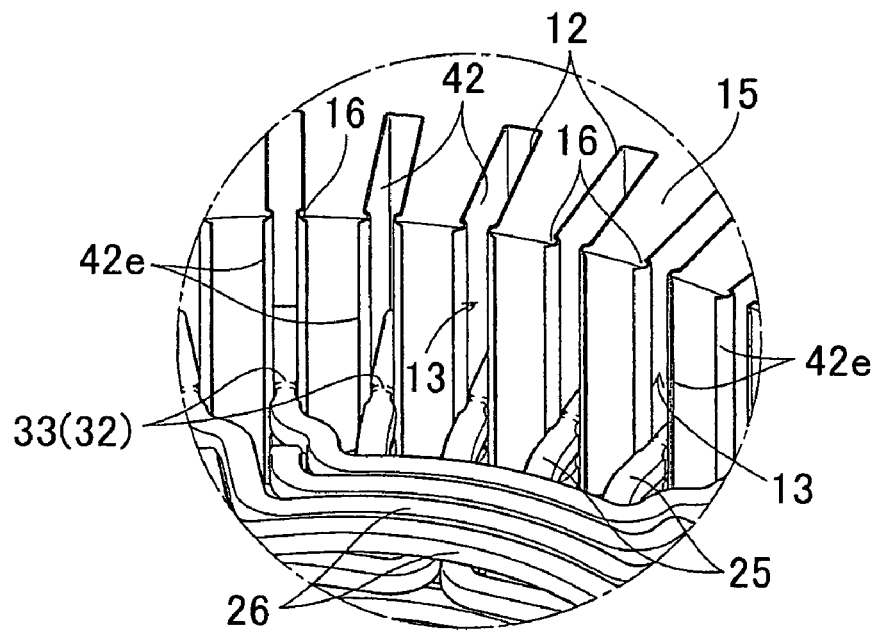
FIG. 11 is a partially enlarged view of FIG. 10.

Additionally, in the present embodiment, as shown in FIGS. 11 and 12, the coils 21 are inserted into the slots 12 in a state where the slot-internal insulation sheets 42 arranged in the slots 12 are open and extending inwardly in the radial direction R with respect to the inner circumferential openings 13 of the slots 12. In other words, each of the slot-internal insulation sheets 42 is arranged so as to take a round in each slot 12 along the inner surface of the slot 12, with its opposite ends 42e both projecting inwardly in the radial direction R with respect to the inner circumferential opening 13. As the slot-internal insulation sheets 42, similarly to the phase-to-phase insulation sheets 41, sheets formed with a material having excellent electrical insulation property and heat resistance, e.g., aramid fibers and polyethylene terephthalate bonded to each other, may be used. In that state, coils 21 are inserted on the inner circumferential side relative to the slot-internal insulation sheets 42 each taking a round along the inner surface of corresponding slot 12. In this way, the coils 21 are inserted into the slots 12 in the inserting step, in a state where the slot-internal insulation sheets 42 are interposed between the stator core 11 and the coils 21 and, therefore, the coils 21 can be inserted into the slots 12 without damaging insulating coats covering the linear conductors 31 forming the coils 21.

Figure 12A:
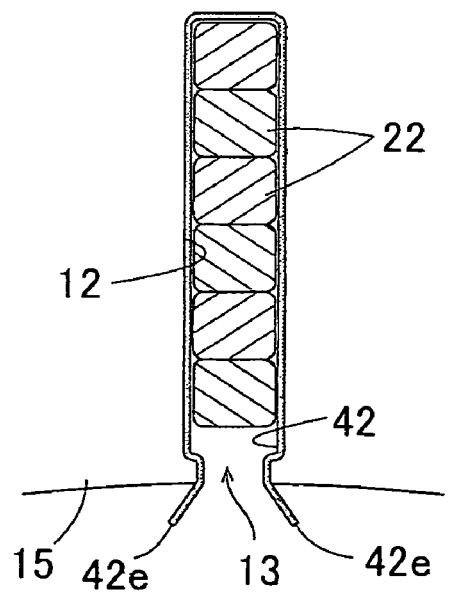
FIGS. 12A and 12B are explanatory drawings for showing latching for manufacturing the stator according to the first embodiment of the present invention.
Figure 12B:
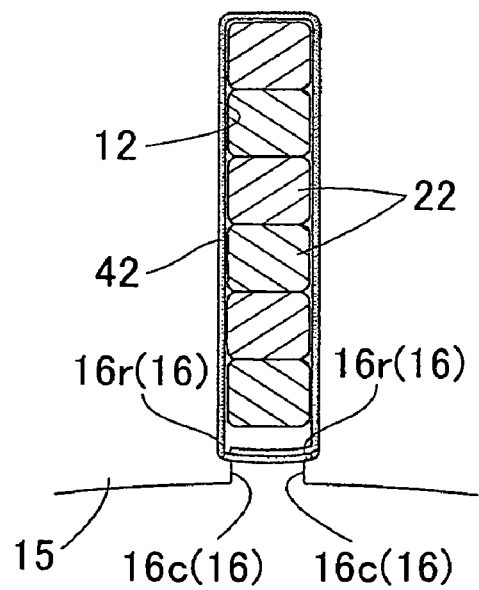

The latching step is a step of latching the ends 42e of each slot-internal insulation sheet 42 extending inwardly in the radial direction R with respect to the inner circumferential opening 13 of each slot 12 onto the projections 16 provided at the teeth 15 of the stator core 11. In the present embodiment, as has been described in the foregoing, the projections 16 each having a substantially rectangular cross section are integrally formed with each tooth 15. Each of the projections 16 has a circumferential wall 16c facing the inner circumferential opening 13 of each slot 12, and a radially outer wall 16r facing the slot interior 14 positioned on the outer side in the radial direction R as seen from the projection 16. In the latching step, as shown in FIGS. 12A and 12B, the opposite ends 42e of each slot-internal insulation sheet 42 are folded in turn and latched onto the radially outer walls 16r of the projections 16. Here, the end 42e on one side in the circumferential direction C is latched onto the radially outer wall 16r of the projection 16 of the tooth 15 on the other side in the circumferential direction C. On the other hand, the end 42e on the other side in the circumferential direction C is latched onto the radially outer wall 16r of the projection 16 of the tooth 15 on the one side in the circumferential direction C, via the slot-internal insulation sheet 42. It is to be noted that, in order to improve workability in folding the ends 42e, it is suitable to put creases in the slot-internal insulation sheets 42 at prescribed positions in the longitudinal direction L in advance.

Thus, the slot-internal insulation sheets 42 are each arranged between the slots 12 and the coil side portions 22 that are the portions of the coils 21 to be arranged inside the slots 12, so as to wrap around the coil side portions 22 and cover the inner circumferential openings 13 of the slots 12. Accordingly, with the slot-internal insulation sheets 42, the electric insulation between the stator core 11 and the coil side portions 22 forming the coils 21, and between the coil side portions 22 and the rotor 3 serving as a field can properly be ensured.

Additionally, since the opposite ends 42e of each slot-internal insulation sheet 42 are latched onto the radially outer walls 16r of the projections 16 respectively provided at adjacent teeth 15 to cover the inner circumferential opening 13 of each slot 12, the coil side portions 22 forming the coils 21 can effectively be prevented from slipping off inwardly in the radial direction R. Accordingly, any member for closing the inner circumferential opening 13 of each slot 12 (such as a wedge) which would otherwise be required becomes unnecessary. Therefore, the manufacturing costs can be lowered and the manufacturing steps can be simplified.

Thereafter, the coils 21 of respective phases are connected at prescribed positions by welding or the like, and the stator 2 according to the present embodiment is completed.

Second Embodiment

Next, a second embodiment of the armature for a rotating electrical machine according to the present invention will be described. FIG. 13 is a plan view partially showing the stator 2 according to the present embodiment. The stator core 11 of the stator 2 is similarly structured as in the first embodiment, except for the structure of the coils 21 of the stator 2, specifically, except for the structure of the narrow-width concave portions 32 of the coils 21. In the following, the structure of the armature for a rotating electrical machine according to the present embodiment will be described focusing on the differences from the first embodiment, referring to FIGS. 13 to 18 as necessary. Those not described in the following are structured similarly as in the first embodiment. Among the drawings referred to in the following description, FIGS. 13, 14 and 18 respectively correspond to FIGS. 3B, 6 and 11 referred to in the first embodiment.

Structure of Radial Conductor Portion

As shown in FIG. 13, in the present embodiment, similarly as in the first embodiment; the linear conductor 31 forming each coil 21 is formed with a single rectangular wire whose cross-sectional shape is substantially rectangular, and formed such that the circumferential width of the linear conductor 31 is substantially equal to the circumferential width W3 of each slot interior 14 (see FIG. 3A). Here, the "circumferential width of the linear conductor" refers to, in the cross section of the linear conductor 31 taken perpendicularly to its extending direction, a width W8 in the circumferential direction C inside each slot 12 (along the first direction D1 shown in FIGS. 16 and 17). The width W8 in the first direction of the linear conductor 31 (hereafter simply referred to as "the first direction width W8") is set to be substantially equal to the circumferential width W3 of each slot interior 14, on the precondition that the coils 21 formed using the linear conductors 31 can physically be inserted into the slot interiors 14. Accordingly, the first direction width W8 of each linear conductor 31 is formed to be larger than the circumferential width W1 of the inner circumferential opening 13 of each slot 12.

Figure 16:
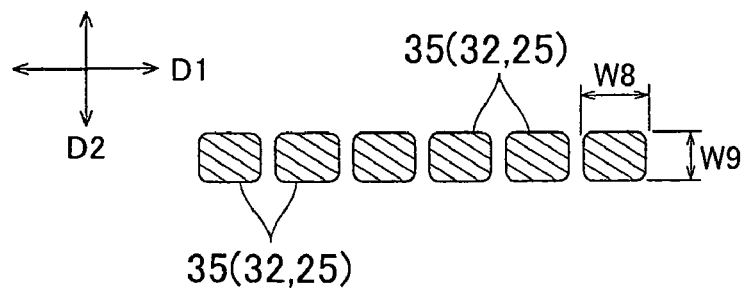
FIG. 16 is a cross-sectional view taken along line XVI-XVI in FIG. 14.
Figure 17:
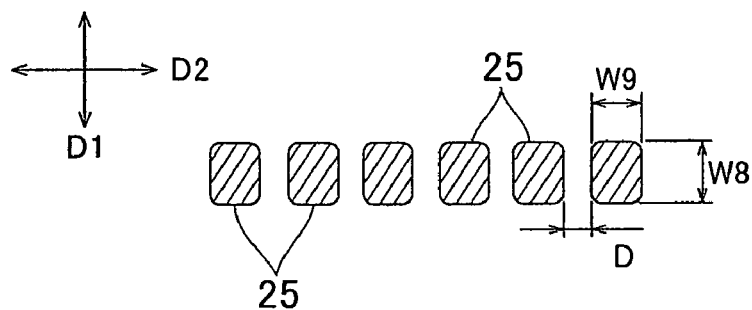
FIG. 17 is a cross-sectional view taken along line XVII-XVII in FIG. 14.

On the other hand, in the cross section of each linear conductor 31 taken perpendicularly to its extending direction, a width W9 of the linear conductor 31 along a direction intersecting with the first direction D1 inside each slot 12 (the second direction D2 shown in FIGS. 16 and 17, which hereinafter will be simply referred to as "the second direction width W9") is formed to be smaller than the circumferential width W1 (see FIG. 3A) of each inner circumferential opening 13. As can be seen in FIGS. 16 and 17, in the present embodiment, the second direction D2 is the direction perpendicular to the first direction D1.

Figure 14:
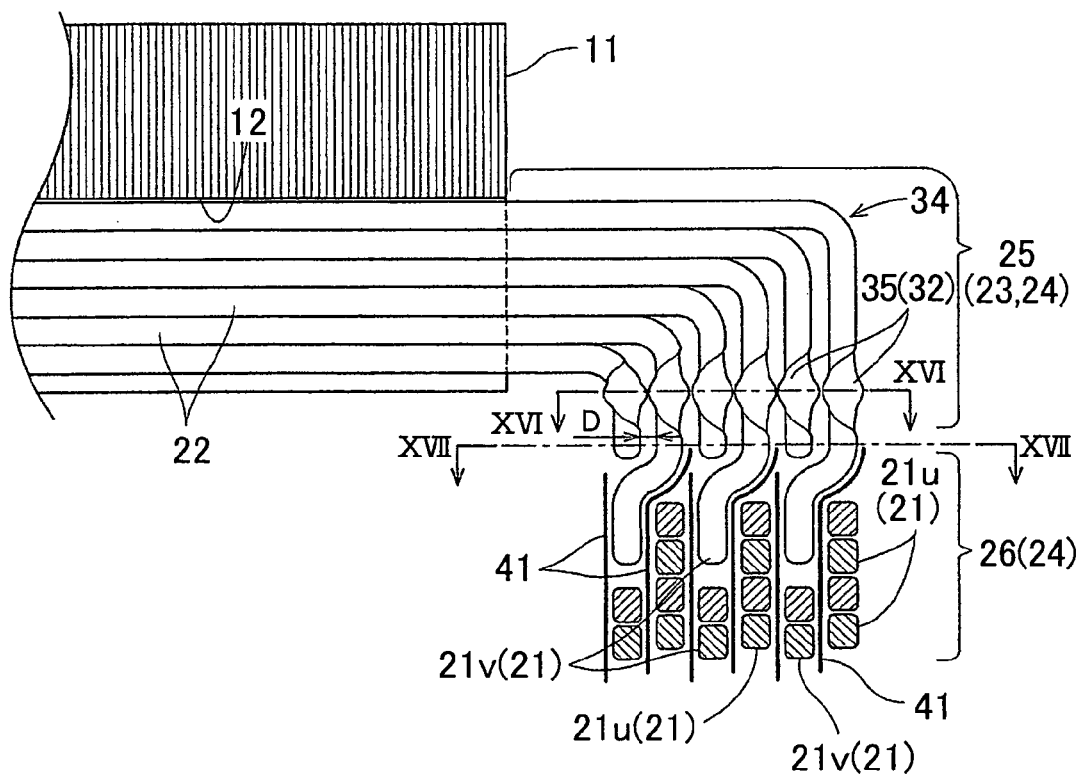
FIG. 14 is a partial cross-sectional view along the longitudinal direction of the stator according to the second embodiment of the present invention.

As in the first embodiment, the linear conductors 31 forming the radial conductor portions 25 are so formed to extend, as also shown in FIG. 14, from the coil side portions 22 in the longitudinal direction L of the stator core 11, and then to be curved inwardly in the radial direction R. Therefore, the portions extending in the radial direction R of the radial conductor portion 25, except for the portions where the narrow-width concave portions 32 are formed, each have a width in the circumferential direction C that is equal to the first direction width W8 of the linear conductor 31, and a width in the longitudinal direction L that is equal to the second direction width W9 of the linear conductor 31 (see FIG. 17).

Figure 15:
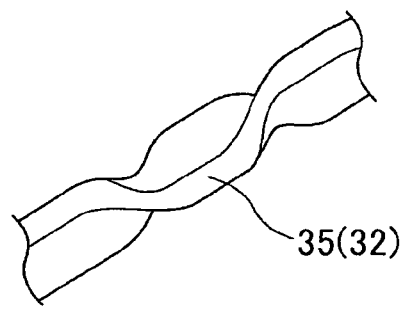
FIG. 15 is an enlarged view of a twist shaped portion according to the second embodiment of the present invention.

In the present embodiment, the narrow-width concave portions 32 of the radial conductor portions 25 are twist shaped portions 35 formed by twisting the sites respectively corresponding to the inner circumferential openings 13 in the radial conductor portions 25 relative to the other portions of the radial conductor portions 25, such that the second direction D2 becomes substantially parallel to the circumferential direction C. Specifically, as shown in FIG. 15, the narrow-width concave portions 32 are the twist shaped portion 35 formed by twisting the sites respectively corresponding to the inner circumferential openings 13 in the radial conductor portions 25 each by a prescribed angle pivoting on the extending direction of the linear conductors 31 forming the radial conductor portions 25. As mentioned above, in the present embodiment, the second direction D2 is perpendicular to the first direction D1, and therefore the above-mentioned predetermined angle is 90 degrees. Further, "the sites respectively corresponding to the inner circumferential openings 13 in the radial conductor portions 25" refers to "the sites in the radial conductor portions 25 that correspond to the inner circumferential openings 13 in terms of the radial position". By forming the narrow-width concave portions 32 as such twist shaped portions 35, the circumferential width W7 of each narrow-width concave portion 32 (strictly, the minimum value of the circumferential width of each narrow-width concave portion 32) becomes equal to the second direction width W9 of the linear conductor 31.

Here, as mentioned above, the second direction width W9 of the linear conductor 31 is formed to be smaller than the circumferential width W1 of the inner circumferential opening 13 of each slot 12. Thus, as shown in FIG. 13, as seen in the longitudinal direction L, the outer shape of the narrow-width concave portions 32 (twist shaped portions 35) is formed so as to conform to the outer shape of the projections 16 provided on the tips of the teeth 15 inwardly extending in the radial direction R of the stator core 11. In other words, as seen in the longitudinal direction L, the projections 16 and the linear conductors 31 forming the radial conductor portions 25 do not overlap with each other. In the present embodiment, the twist shaped portion 35 is formed such that the portion in the twist shaped portion 35 with the smallest circumferential width and the circumferential wall 16c of the inner circumferential opening 13 overlap each other in the radial direction R. Accordingly, the coils 21 can be inserted in the longitudinal direction L from the curved coil end portion 24 side into the slots 12, while the radial conductor portions 25 and the inner circumferential openings 13 of the slots 12 are prevented from interfering with each other.

In the present embodiment, the narrow-width concave portions 32 are so formed that the sites corresponding to the inner circumferential openings 13 in the radial conductor portions 25 are twisted relative to the other portions of the radial conductor portions 25 such that the second direction D2 becomes substantially parallel to the circumferential direction C. Therefore, the longitudinal direction height of the narrow-width concave portion 32 (strictly, the maximum value of the longitudinal direction height of the narrow-width concave portion 32) becomes equal to the first direction width W8 of the linear conductor 31 (see FIG. 16). On the other hand, the longitudinal direction height of the portions extending in the radial direction R of the radial conductor portions 25 except for the portions where the narrow-width concave portions 32 are formed becomes equal to the second direction width W9 of the linear conductor 31 (see FIG. 17). In other words, the longitudinal direction height of the linear conductors 31 in the narrow-width concave portions 32 is higher than that of the linear conductors 31 in other portions of the radial conductor portions 25 adjacent to the narrow-width concave portions 32. Additionally, as shown in FIG. 14, owing to the fact that the narrow-width concave portions 32 are arranged to be juxtaposed to one another in the longitudinal direction L, the narrow-width concave portions 32 have respective portions with high longitudinal direction height abutting on one another in the longitudinal direction L, thereby repelling one another. As a result, as can be seen in FIGS. 14, 16 and 17, in the sites in the curved coil end portions 24 except for the twist shaped portions 35, similarly to the first embodiment, the longitudinal direction interval D between the linear conductors 31 adjacent to one another in the longitudinal direction L is formed wide without providing any particular spacer or the like.

Additionally, in the present embodiment, the narrow-width concave portions 32 are formed as the twist shaped portions 35, so naturally, as in the first embodiment, across the entire radial direction R of each of the narrow-width concave portions 32, the cross-sectional area of the narrow-width concave portion 32 perpendicular to the current passing direction of the coil 21 is substantially equal to the cross-sectional area of the other sites except for the narrow-width concave portion 32.

Meanwhile, in order to take full advantage of the stator core 11 that is a semi-open slot type core, the circumferential width W1 of each inner circumferential opening 13 is desirably minimized under the condition that the inner circumferential openings 13 and the linear conductors 31 do not interfere with each other. In the present embodiment, such interference can be avoided simply by employing the linear conductors 31 whose second direction D2 width is smaller than the circumferential width W1 of each inner circumferential opening 13.

Manufacturing Method of Stator

A manufacturing method of the stator 2 according to the present embodiment is basically the same as the first embodiment, but different in including "a twisting step" instead of "the compressing step". In other words, in the present embodiment, the narrow-width concave portion forming step is carried out by the twisting step.

The twisting step is a step of twisting the sites respectively corresponding to the inner circumferential openings 13 in the radial conductor portions 25 relative to the other portions of the radial conductor portions 25 such that the second direction D2 becomes substantially parallel to the circumferential direction C. Here, "the sites respectively corresponding to the inner circumferential openings 13 in the radial conductor portions 25" refers to "the sites in the radial conductor portions 25 that correspond to the inner circumferential openings 13 in terms of the radial position". Through the twisting step, the twist shaped portions 35 serving as the narrow-width concave portions 32 are formed. Since the narrow-width concave portion forming step is carried out by the twisting step, it is not necessary to greatly deform the radial conductor portions 25 locally, nor to apply great force to the radial conductor portions 25 locally. Therefore, the insulation films (such as enamel) covering the linear conductors 31 can be prevented from being damaged by formation of the narrow-width concave portions 32.

It is to be noted that, the twisting step may be carried out using, for example, a twisting mechanism that includes: a holding mechanism that holds sites that are adjacent, on opposite sides in the linear-conductor-31-extending direction, to the site where the twist shaped portion 35 is to be formed; and a rotary mechanism that grips around the central portion in the extending direction of the site where the twist shaped portion 35 is to be formed, and that rotates the gripped site by a prescribed angle (90 degrees in the present embodiment) pivoting on the linear-conductor-31-extending direction, whereby the twist shaped portion 35 as shown in FIG. 15 can be formed. It is to be noted that, similarly to the compressing step in the first embodiment, such a twisting step may be carried out on the linear conductor 31 forming each of the coils 21 of respective phases that is preformed in the coil preforming step. Alternatively, it may be carried out on the linear conductor 31 before the liner conductor 31 is subjected to the coil preforming step.

Figure 18:
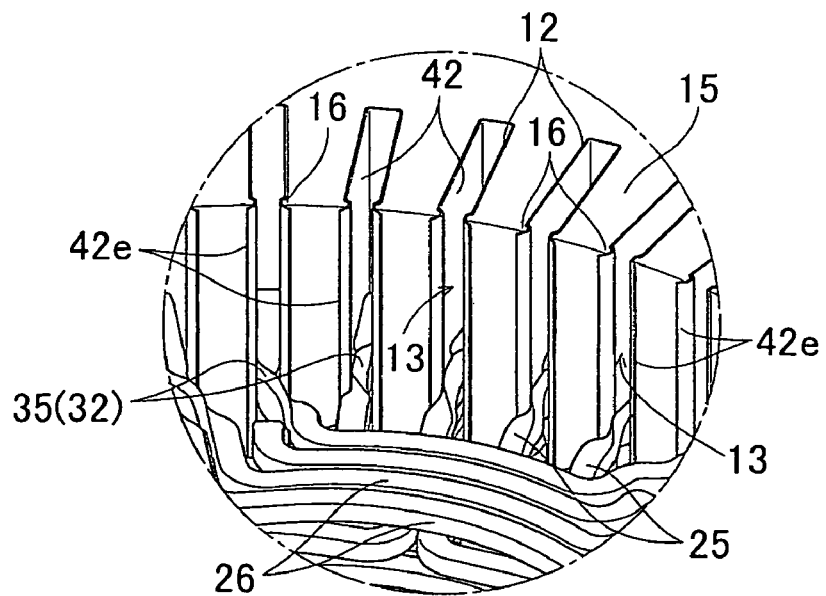
FIG. 18 is an explanatory drawing of the inserting step for manufacturing the stator according to the second embodiment of the present invention.

The inserting step is, in the present embodiment, as shown in FIG. 18, a step of inserting in the longitudinal direction L the coils 21 into the slots 12 from the curved coil end portion 24 side, in a state where the twist shaped portions 35 formed in the twisting step is aligned at the inner circumferential openings 13.

Other Embodiments (1) In the first embodiment, the description has been given about the exemplary case where the narrow-width concave portions 32 are formed as the compressive shaped portions 33 formed by compressing in the circumferential direction C the radial conductor portions 25. In the second embodiment, the description has been given about the exemplary case where the narrow-width concave portions 32 are formed as the twist shaped portions 35. However, embodiments of the present invention are not limited thereto. In other words, it is only necessary that the narrow-width concave portions 32 are each formed such that its circumferential width W7 is smaller than the circumferential width W1 of the inner circumferential opening 13 of each slot 12. For example, formation of the narrow-width concave portions 32 as narrow-width groove portions by cutting work or the like is likewise one of the suitable embodiments of the present invention.

(2) In the first embodiment, the description has been given about the exemplary case where the narrow-width concave portions 32 are formed as the compressive shaped portions 33 which are formed by being compressed in the circumferential direction C and being extended in the longitudinal direction L, such that the area of the cross section of each compressive shaped portion 33 taken perpendicularly to the current passing direction of the coil 21 is substantially equal to the cross-sectional area of the other sites. However, embodiments of the present invention are not limited thereto. In other words, for example, formation of the narrow-width concave portions 32 as the compressive shaped portions 33 that is only compressed in the circumferential direction C and is not extended in the longitudinal direction L is likewise one of the suitable embodiments of the present invention. Additionally, in the case where the compressive shaped portion 33 is formed by being compressed in the circumferential direction C and being extended in the longitudinal direction L, formation of the narrow-width concave portions 32 as the compressive shaped portions 33 such that the area of the cross section of each compressive shaped portion 33 taken perpendicularly to the current passing direction of the coil 21 is different from the cross-sectional area of the other sites is likewise one of the suitable embodiments of the present invention.

(3) In the first embodiment, the description has been given about the exemplary case where each of the linear conductor 31 is formed with a single rectangular wire whose cross section is substantially rectangular, and formed such that its circumferential width W5 is substantially equal to the circumferential width W3 of each slot interior 14. However, embodiments of the present invention are not limited thereto. In other words, it is only necessary that the circumferential width W5 of the linear conductor 31 is larger than the circumferential width W1 of the inner circumferential opening 13 of each slot 12, and therefore it may be set to any width between the circumferential width W1 of the inner circumferential opening 13 and the circumferential width W3 of the slot interior 14. Also, the cross-sectional shape of the linear conductor 31 is not particularly limited, and various shapes can be employed therefore such as a circular or a polygonal shape. Additionally, if the circumferential width W5 thereof is set to be larger than the circumferential width W1 of the inner circumferential opening 13, a conductor that is an assembly of a plurality of conductors gathered as if they are a single conductor can be used as the linear conductor 31. For example, a stranded conductor or the like may be used, which is integrally formed by stranding a plurality of conductors.

(4) In the second embodiment, the description has been given about the exemplary case where each of the linear conductor 31 is formed with a single rectangular wire whose cross section is substantially rectangular, and formed such that its first direction width W8 is substantially equal to the circumferential width W3 of each slot interior 14. However, embodiments of the present invention are not limited thereto. In other words, it is only necessary that the first direction width W8 of the linear conductor 31 is larger than the circumferential width W1 of the inner circumferential opening 13 of each slot 12, and therefore it may be set to any width between the circumferential width W1 of the inner circumferential opening 13 and the circumferential width W3 of the slot interior 14. Also, the linear conductor 31 is not limited to those whose cross-sectional shape is rectangular. In other words, if the first direction width W8 is larger than the circumferential width W1 of the inner circumferential opening 13 of the slot 12, and the second direction width W9 is smaller than the circumferential width W1 of the inner circumferential opening 13 of the slot 12, a linear conductor 31 with various cross-sectional shapes, for example an oval or a polygonal shape, can be employed. In this case, it may be so structured that the second direction D2 is not perpendicular to the first direction D1. For example, the second direction D2 may suitably be directed so as to cross the first direction D1 and directed such that the second direction width W9 is minimized. Additionally, a conductor that is an assembly of a plurality of conductors gathered as if they are a single conductor can be used as the linear conductor 31. For example, a stranded conductor or the like may be used, which is integrally formed by stranding a plurality of conductors.

(5) In the second embodiment, the description has been given about the exemplary case where each of the linear conductors 31 has a substantially rectangular cross-sectional shape with long sides and short sides, in which the first direction D1 is the direction along the long sides and the second direction D2 is the direction along the short sides, whereby the second direction D2 is perpendicular to the first direction D1. However, embodiments of the present invention are not limited thereto. In other words, if the projections 16 provided at the tips of the teeth 15 inwardly extending in the radial direction R of the stator core 11 and the linear conductors 31 forming the radial conductor portions 25 can be formed such that there are no overlap between them, as seen in the longitudinal direction L, the second direction D2, which has been described to be substantially parallel to the circumferential direction C in the twist shaped portions 35, may be directed not along the short sides of the substantially rectangular cross section. For example, the second direction D2 may be the direction forming a prescribed angle with respect to the first direction D1 other than 90 degrees (for example, 70 or 80 degrees). In this case, the narrow-width concave portions 32 are formed as the twist shaped portions 35 formed by twisting the site corresponding to the inner circumferential opening 13 in each radial conductor portion 25 by the prescribed angle pivoting on the extending direction of the linear conductors 31 forming the radial conductor portions 25.

(6) In the second embodiment, the description has been given about the exemplary case where the twist shaped portion 35 is formed such that the portion of the twist shaped portion 35 having the smallest circumferential width and the circumferential wall 16c of the inner circumferential opening 13 overlap each other in the radial direction R. However, embodiments of the present invention are not limited thereto. In other words, as seen in the longitudinal direction L, if any overlap can be avoided between the projections 16 provided at the tips of the teeth 15 inwardly extending in the radial direction R of the stator core 11 and the linear conductors 31 forming the radial conductor portions 25, the twist shaped portion 35 may be formed such that any portion of the twist shaped portion 35 other than the portion with the smallest circumferential width and the circumferential wall 16c of the inner circumferential opening 13 may overlap each other in the radial direction R.

(7) In the second embodiment, the description has been given about the exemplary case where the manufacturing method of the stator 2 includes "the twisting step" in place of "the compressing step", i.e., it does not include "the compressing step". However, embodiments of the present invention are not limited thereto. In other words, one suitable embodiment of the present invention may also be a case in which the manufacturing method of the stator 2 further includes, in addition to the twisting step, a compressing step of compressing in the circumferential direction C the curved portions 34 in the coils 21 of respective phases such that they are shaped to have the circumferential width that is substantially equal to the first direction width W8 of the linear conductor 31. This embodiment can suitably be practiced when a bulge projecting in the circumferential direction C is developed in each of the curved portions 34 connecting between the coil side portions 22 and the radial conductor portions 25 in the curved coil end portions 24.

(8) In the first and second embodiments, the description has been given about the exemplary cases where the stator 2 is a stator used for the rotating electrical machine 1 driven by a three-phase alternating current. However, embodiments of the present invention are not limited thereto. In other words, one suitable embodiment of the present invention may also be a case in which the stator 2 is used for a rotating electrical machine 1 driven by a single-phase alternating current. Alternatively, one suitable embodiment of the present invention may also be a case in which the stator 2 is used for a rotating electrical machine 1 driven by a two-phase alternating current, or a four-phase alternating current or more.

(9) In the first and second embodiments, the description has been given about the exemplary cases where the three sets of coils 21 formed as shown in FIG. 4 are arranged adjacent to one another in the radial direction R in the same slot 12 such that six coil side portions 22 are arranged in every slot 12 as being aligned in one row in the radial direction R. However, embodiments of the present invention are not limited thereto. In other words, the number of the coil side portions 22 arranged in every slot 12 as being aligned in one row in the radial direction R can be changed as appropriate. Additionally, the shape of preformed coil 21 shown in FIG. 4 is merely an example, and therefore various shapes can be employed.

(10) In the first and second embodiments, the description has been given about the exemplary cases where each of the phase-to-phase insulation sheets 41 is interposed between respective linear conductors 31 forming respective different phase coils 21 and being adjacent to one another in the longitudinal direction L in the curved coil end portions 24. However, embodiments of the present invention are not limited thereto. In other words, one suitable embodiment of the present invention may also be a case in which the phase-to-phase insulation sheets 41 are not provided depending on the conditions of use. As has been described in the foregoing, in the first and second embodiments, the longitudinal direction interval D between each of adjacent linear conductors 31 in the longitudinal direction L at the curved coil end portions 24 is wide. Accordingly, depending on the conditions such as the maximum value of the current passing through the coils 21 or the maximum value of the voltage applied across the coils 21, it becomes possible to ensure the electric insulation among the coils 21 of respective phases only with the insulation film covering the surface of each linear conductor 31 and without interposing the phase-to-phase insulation sheets 41.

(11) In the first and second embodiments, the description has been given about the exemplary cases where each of the projections 16 has the circumferential wall 16c and the radially outer wall 16r, and its cross section is substantially rectangular. However, embodiments of the present invention are not limited thereto. In other words, as the projections 16, those in various shapes can be employed. For example, one suitable embodiment of the present invention may also be a case where each projection 16 does not have the circumferential wall 16c and its cross section is substantially triangular, so that the circumferential width between two projections 16 of respective adjacent teeth 15 that project facing each other in the circumferential direction C becomes larger from each inner circumferential opening 13 toward the outer side in the radial direction R.

(12) In the first and second embodiments, the description has been given about the exemplary cases where the opposite ends 42e of each of the slot-internal insulation sheets 42 are folded in turn and latched onto the radially outer walls 16r of the projections 16, thereby covering the inner circumferential opening 13 of each slot 12, and preventing the coil side portions 22 forming the coils 21 from slipping off inwardly in the radial direction R. However, embodiments of the present invention are not limited thereto. In other words, one suitable embodiment of the present invention may also be a case in which, with or without having the opposite ends 42e of each slot-internal insulation sheet 42 be latched onto the radially outer walls 16r of the projections 16, a separate closing member such as a wedge is provided so as to close each inner circumferential opening 13 of the slot 12.

(13) In the first embodiment, the description has been given about the exemplary case where, in the compressing step, simultaneously with compressing in the circumferential direction C the radial direction R position in the radial conductor portions 25 corresponding to the inner circumferential openings 13, the curved portions 34 are also compressed in the circumferential direction C. However, embodiments of the present invention are not limited thereto. In other words, it is likewise one of the suitable embodiments of the present invention to separately perform the step of compressing in the circumferential direction C the curved portions 34 in the coils 21 of respective phases so that the curved portions 34 are each shaped to have the circumferential width that is substantially equal to the circumferential width W5 of the linear conductor 31, and the step of compressing in the circumferential direction C the radial direction R positions in the radial conductor portions 25 corresponding to the inner circumferential openings 13 of the slots 12 of the stator core 11 so that the circumferential width W7 of each compressed portion becomes smaller than the circumferential width W1 of each inner circumferential opening 13. Here, the latter step may suitably be performed on the linear conductor 31 before the linear conductor 31 is subjected to the coil preforming step.

(14) In the first and second embodiments, the description has been given about the exemplary cases where, in the inserting step, the coils 21 are inserted into the slots 12 in a state where the slot-internal insulation sheets 42 arranged in the slots 12 are each open and extending inwardly in the radial direction R with respect to the inner circumferential openings 13 of the slots 12. However, embodiments of the present invention are not limited thereto. In other words, it is likewise one of the suitable embodiments of the present invention to insert the coils 21 into the slots 12 in a state, for example, where the slot-internal insulation sheets 42 are wrapped around the coil side portions 22 in advance.

(15) In the first and second embodiments, the description has been given about the exemplary cases where, the armature for a rotating electrical machine according to the present invention is applied to the stator 2 serving as a stator of the rotating electrical machine 1, so that the rotating electrical machine 1 is an inner rotor type rotating electrical machine including the stator 2 as the armature. However, embodiments of the present invention are not limited thereto. In other words, it is likewise one of the suitable embodiments of the present invention to apply, for example, the armature for a rotating electrical machine according to the present invention to a rotor of the rotating electrical machine 1, so that the rotating electrical machine 1 is an outer rotor type rotating electrical machine including the rotor as the armature.

The present invention can suitably be used for an armature for a rotating electrical machine including a cylindrical core having a plurality of longitudinally extending slots dispersedly arranged circumferentially, and coils wound around the slots.

What is claimed is:

1. An armature for a rotating electrical machine, comprising:
    a cylindrical core having a plurality of longitudinally extending slots that are dispersedly arranged in a circumferential direction; and
    coils wound around the slots, wherein
    each of the slots is formed such that an inner circumferential opening thereof that is open radially inwardly is smaller in a circumferential width than a slot interior positioned on a radially outer side of the inner circumferential opening, and linear conductors forming the coils are each formed to be larger in the circumferential width than the inner circumferential opening,
    the coils include coil end portions connecting between coil side portions arranged in different ones of the slots at opposite longitudinal ends of the core, and the coil end portions located on one longitudinal side of the slots are curved coil end portions formed as curved radially inwardly,
    the curved coil end portions each include radial conductor portions radially extending from the coil side portions, and a circumferential conductor portion connecting between a pair of the radial conductor portions on a radially inner side of the inner circumferential openings, and
    the radial conductor portions are each provided with a narrow-width concave portion that is recessed relative to other portions of the radial conductor portion, at a radial position in the radial conductor portion corresponding to one of the inner circumferential openings, so as to be smaller in the circumferential width than the inner circumferential opening.

2. The armature for a rotating electrical machine according to claim 1, wherein
    the narrow-width concave portions are each a compressive shaped portion formed with the radial conductor portion that is circumferentially compressed and longitudinally extended.

3. The armature for a rotating electrical machine according to claim 2, wherein
    in the coils, a plurality of such linear conductors forming the coil side portions are arranged radially juxtaposed to one another in each of the slots, and the linear conductors forming the curved coil end portions are arranged longitudinally juxtaposed to one another, and
    the narrow-width concave portions are arranged longitudinally juxtaposed to one another.

4. The armature for a rotating electrical machine according to claim 3, wherein
    the coils are of a plurality of phases that are different from one another, and
    in the coils of respective phases, the linear conductors of respective different phases forming the circumferential conductor portions are arranged longitudinally juxtaposed to one another.

5. The armature for a rotating electrical machine according to claim 4, wherein
    a phase-to-phase insulation sheet is arranged between respective linear conductors of different phases, on a radially inner side of the compressive shaped portions in the curved coil end portions.

6. The armature for a rotating electrical machine according to claim 1, wherein
    in a cross section of each of the linear conductors taken perpendicularly to an extending direction of the linear conductor, a direction along the circumferential direction inside each of the slots is a first direction and a direction perpendicular to the first direction is a second direction,
    the linear conductors are each formed such that a second direction width is smaller than the circumferential width of each of the inner circumferential openings, and
    each of the narrow-width concave portions is a twist shaped portion formed with the radial conductor portion having a site thereof corresponding to one of the inner circumferential openings twisted relative to other portions of the radial conductor portion, such that the second direction becomes substantially parallel to the circumferential direction.

7. The armature for a rotating electrical machine according to claim 6, wherein
    in the coils, a plurality of such linear conductors forming the coil side portions are arranged radially juxtaposed to one another in each of the slots, and the linear conductors forming the curved coil end portions are arranged longitudinally juxtaposed to one another, and
    the narrow-width concave portions are arranged longitudinally juxtaposed to one another.

8. The armature for a rotating electrical machine according to claim 7, wherein
    the coils are of a plurality of phases that are different from one another, and
    in the coils of respective phases, the linear conductors of respective different phases forming the circumferential conductor portions are arranged longitudinally juxtaposed to one another.

9. The armature for a rotating electrical machine according to claim 8, wherein a phase-to-phase insulation sheet is arranged between respective linear conductors of different phases, on a radially inner side of the compressive shaped portions in the curved coil end portions.

10. The armature for a rotating electrical machine according to claim 1, wherein
the core includes projections at a tip of a radially inwardly projecting tooth positioned between the slots adjacent to each other, the projections oppositely projecting in the circumferential direction to form opposite circumferential walls of the inner circumferential openings,
a slot-internal insulation sheet is arranged between each slot and the coil side portions therein, so as to wrap around the coil side portions and to cover the inner circumferential opening, and
opposite ends in a wrapping direction of the slot-internal insulation sheet are latched onto the projections.

11. A manufacturing method of an armature for a rotating electrical machine including a cylindrical core having a plurality of longitudinally extending semi-open type slots that are dispersedly arranged in a circumferential direction, and coils wound around the slots, wherein
linear conductors forming the coils are each formed to be larger in a circumferential width than an inner circumferential opening of each of the slots that is open radially inwardly, and
the coils include curved coil end portions each connecting between coil side portions arranged in different ones of the slots at one longitudinal end of the core, and each formed as curved radially inwardly, the method comprising:
forming of, at a radial position corresponding to one of the inner circumferential openings in a radial conductor portion extending radially from each of the coil side portions in the curved coil end portions, a narrow-width concave portion that is recessed relative to other portions of the radial conductor portion, such that the narrow-width concave portion becomes smaller in the circumferential width than the inner circumferential opening; and
inserting longitudinally the coils from a curved coil end portion side into the slots in a state where the narrow-width concave portion formed in the forming of the narrow-width concave portion is aligned at a position of the inner circumferential opening.

12. The manufacturing method of an armature for a rotating electrical machine according to claim 11, wherein
the forming of the narrow-width concave portion is compressing circumferentially a site in the radial conductor portion corresponding to the inner circumferential opening.

13. The manufacturing method of an armature for a rotating electrical machine according to claim 12, wherein
in a cross section of each of the linear conductors taken perpendicularly to an extending direction of the linear conductor, a direction along a circumferential direction inside each of the slots is a first direction and a direction perpendicular to the first direction is a second direction,
the linear conductors are each formed such that a second direction width is smaller than the circumferential width of the inner circumferential opening, and
the forming of the narrow-width concave portion is twisting a site corresponding to the inner circumferential opening in the radial conductor portion relative to other portions of the radial conductor portion, such that the second direction becomes substantially parallel to the circumferential direction.

14. The manufacturing method of an armature for a rotating electrical machine according to claim 11, wherein
in the compressing, simultaneously with the formation of the narrow-width concave portion, a curved portion of the radial conductor portion constituting the coils is further compressed circumferentially.

15. The manufacturing method of an armature for a rotating electrical machine according to claim 11, wherein
the core includes projections at a tip of a radially inwardly projecting tooth positioned between the slots adjacent to each other, the projections oppositely projecting in the circumferential direction to form opposite circumferential walls of the inner circumferential openings, and
in the inserting, the coils are inserted into the slots in a state where a slot-internal insulation sheet arranged in each of the slots is open while extending radially inwardly with respect to the inner circumferential opening, the method further comprising:
latching ends of the slot-internal insulation sheet extending radially inwardly onto the projections, after the inserting.

* * * * *